(12) United States Patent
Kabisa et al.

(10) Patent No.: US 12,210,954 B2
(45) Date of Patent: Jan. 28, 2025

(54) BAYESIAN NEURAL NETWORK POINT ESTIMATOR

(71) Applicant: SAS Institute Inc., Cary, NC (US)

(72) Inventors: Sylvie Tchumtchoua Kabisa, Morrisville, NC (US); Xilong Chen, Chapel Hill, NC (US); Gunce Eryuruk Walton, Raleigh, NC (US); David Bruce Elsheimer, Clayton, NC (US); Ming-Chun Chang, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 18/530,798

(22) Filed: Dec. 6, 2023

(65) Prior Publication Data

US 2024/0346289 A1  Oct. 17, 2024

Related U.S. Application Data

(60) Provisional application No. 63/460,015, filed on Apr. 17, 2023.

(51) Int. Cl.
*G06N 3/04* (2023.01)
*G06N 3/045* (2023.01)
*G06N 3/08* (2023.01)
*G06N 3/084* (2023.01)

(52) U.S. Cl.
CPC .............. *G06N 3/04* (2013.01); *G06N 3/045* (2023.01); *G06N 3/08* (2013.01); *G06N 3/084* (2013.01)

(58) Field of Classification Search
CPC .............................. G06N 3/045; G06N 3/084
See application file for complete search history.

(56) References Cited

U.S. PATENT DOCUMENTS

| | | | |
|---|---|---|---|
| 10,360,517 B2 | 7/2019 | Koch et al. | |
| 10,600,005 B2 | 3/2020 | Gunes et al. | |
| 10,832,174 B1 | 11/2020 | Chen et al. | |
| 11,093,833 B1 | 8/2021 | Gardner et al. | |

(Continued)

OTHER PUBLICATIONS

Cui et al, "Learning Pairwise Interactions with Bayesian Neural Networks", 2019, arXiv:1901.08361v2, pp. 1-17. (Year: 2019).*

(Continued)

*Primary Examiner* — Alexey Shmatov
*Assistant Examiner* — Clint Mullinax
(74) *Attorney, Agent, or Firm* — Bell & Manning, LLC

(57) ABSTRACT

A point estimate value for an individual is computed using a Bayesian neural network model (BNN) by training a first BNN model that computes a weight mean value, a weight standard deviation value, a bias mean value, and a bias standard deviation value for each neuron of a plurality of neurons using observations. A plurality of BNN models is instantiated using the first BNN model. Instantiating each BNN model of the plurality of BNN models includes computing, for each neuron, a weight value using the weight mean value, the weight standard deviation value, and a weight random draw and a bias value using the bias mean value, the bias standard deviation value, and a bias random draw. Each instantiated BNN model is executed with the observations to compute a statistical parameter value for each observation vector of the observations. The point estimate value is computed from the statistical parameter value.

30 Claims, 16 Drawing Sheets

(56) References Cited

U.S. PATENT DOCUMENTS

| | | | |
|---|---|---|---|
| 11,354,566 B1 | 6/2022 | Chen et al. | |
| 2023/0351249 A1* | 11/2023 | Livny | G06N 3/047 |

OTHER PUBLICATIONS

Guan et al, "Recursive Binary Neural Network Training Model for Efficient Usage of On-Chip Memory", 2019, IEEE Transactions on Circuits and Systems-I: Regular Papers, vol. 66, No. 7, pp. 2593-2605. (Year: 2019).*

Zheng et al, "A modified Bayesian neural network integrating stochastic configuration network and ensemble learning strategy", 2021, 2021 International Conference on Information, Cybernetics, and Computational Social Systems (ICCSS), pp. 268-272. (Year: 2021).*

Legler et al, "Combining data assimilation and machine learning to estimate parameters of a convective-scale model", 2022, Quarterly Journal of the Royal Meteorological Society, vol. 148, Issue 743 pp. 860-874. (Year: 2022).*

Blundell, C., Cornebise, K. Kavukcuoglu, and Wierstra, D. (2015) Weight uncertainty in neural network, in Proceedings of the 32nd International Conference on Machine Learning, ser. Proceedings of Machine Learning Research, vol. 37, 2015, pp. 1613-1622.

Chernozhukov, Victor, Denis Chetverikov, Mert Demirer, Esther Duflo, Christian Hansen, Whitney Newey, James Robins, Double/debiased machine learning for treatment and structural parameters, The Econometrics Journal, vol. 21, Issue 1, Feb. 1, 2018, pp. C1-C68, https://doi.org/10.1111/ectj.12097.

Chesnaye NC, Stel VS, Tripepi G, Dekker FW, Fu EL, Zoccali C, Jager KJ. An introduction to inverse probability of treatment weighting in observational research. Clin Kidney J. Aug. 26, 2021;15(1):14-20. doi: 10.1093/ckj/sfab158. PMID: 35035932; PMCID: PMC8757413. https://www.ncbi.nlm.nih.gov/pmc/articles/PMC8757413/.

Colangelo, Kyle, and Lee, Ying-Ying (Jun. 2022) Double Debiased Machine Learning Nonparametric Inference with Continuous Treatments. arXiv:2004.03036v7.

Farrell, Max H. and Liang, Tengyuan and Misra, Sanjog (2020) Deep Learning for Individual Heterogeneity: An Automatic Inference Framework. arXiv.2010.14694.

Jospin, L. V. Laga, H, Boussaid, F., Buntine, W. and M. Bennamoun (May 2022), Hands-On Bayesian Neural Networks A Tutorial for Deep Learning Users, in IEEE Computational Intelligence Magazine, vol. 17, No. 2, pp. 29-48.

Gal, Y., & Smith, L. 2018, Sufficient Conditions for Idealised Models to Have No Adversarial Examples: a Theoretical and Empirical Study with Bayesian Neural Networks. arXiv:1806.00667.

Lakshminarayanan, B., Pritzel, A., & Blundell, C. 2017, "Simple and Scalable Predictive Uncertainty Estimation using Deep Ensembles." Advances in Neural Information Processing Systems 30, ed. I. Guyon, U. V. Luxburg, S. Bengio et al. (Red Hook, NY: Curran Associates), 6402.

Li, F., Ding, P. and Mealli, F. (Oct. 2022), "Bayesian Causal Inference: A Critical Review," ArXiv e-prints URL: https://doi.org/10.48550/arXiv.2206.15460.

SAS Documentation. "SAS Econometrics Procedures". Chapter 14. The DeepCausal Procedure. Aug. 17, 2023, SAS Institute Inc, Cary, NC. 851-896.

SAS Documentation. "SAS Econometrics Procedures". Chapter 15. The DeepPrice Procedure. Aug. 17, 2023, SAS Institute Inc, Cary, NC. 897-954.

SAS/STAT 14.2 User's Guide. The CausalTRT Procedure. Chapter 33. The CausalTRT Procedure. 2016, SAS Institute Inc, Cary, NC. 2053-2110.

Farrell, Max H., Tengyuan Liang, and Sanjog Misra. Deep Learning for Individual Heterogeneity: An Automatic Inference Framework. No. 2010.14694. 2021.

Beker, W., Wolos, A., Szymkuc, S., and Grzybowski, B. A. (2020). "Minimal-uncertainty prediction of general drug-likeness based on Bayesian neural networks," Nature Machine Intelligence, vol. 2, No. 8, pp. 457-465.

Chronopoulos, I., Chrysikou, K., Kapetanios, G., Mitchell, J., and Raftapostolos, A. (2023). "Deep Neural Network Estimation in Panel Data Models." Working Paper No. 23-15. Federal Reserve Bank of Cleveland. https://doi.org/10.26509/frbc-wp-202315.

Kapetanios, G., Kempf, F. and Massacci, D. (2023). "Interpretable Machine Learning for Asset Pricing". Available at SSRN: https://ssrn.com/abstract=4473746 or http://dx.doi.org/10.2139/ssrn.4473746.

Zhang, X. and. Mahadevan, S. (2020). "Bayesian neural networks for flight trajectory prediction and safety assessment," Decision Support Systems, vol. 131, p. 113246.

D. Wang, M. Li, Stochastic configuration networks: Fundamentals and algorithms, IEEE Transactions on Cybernetics, 47(10)(2017) 3466-3479.

* cited by examiner

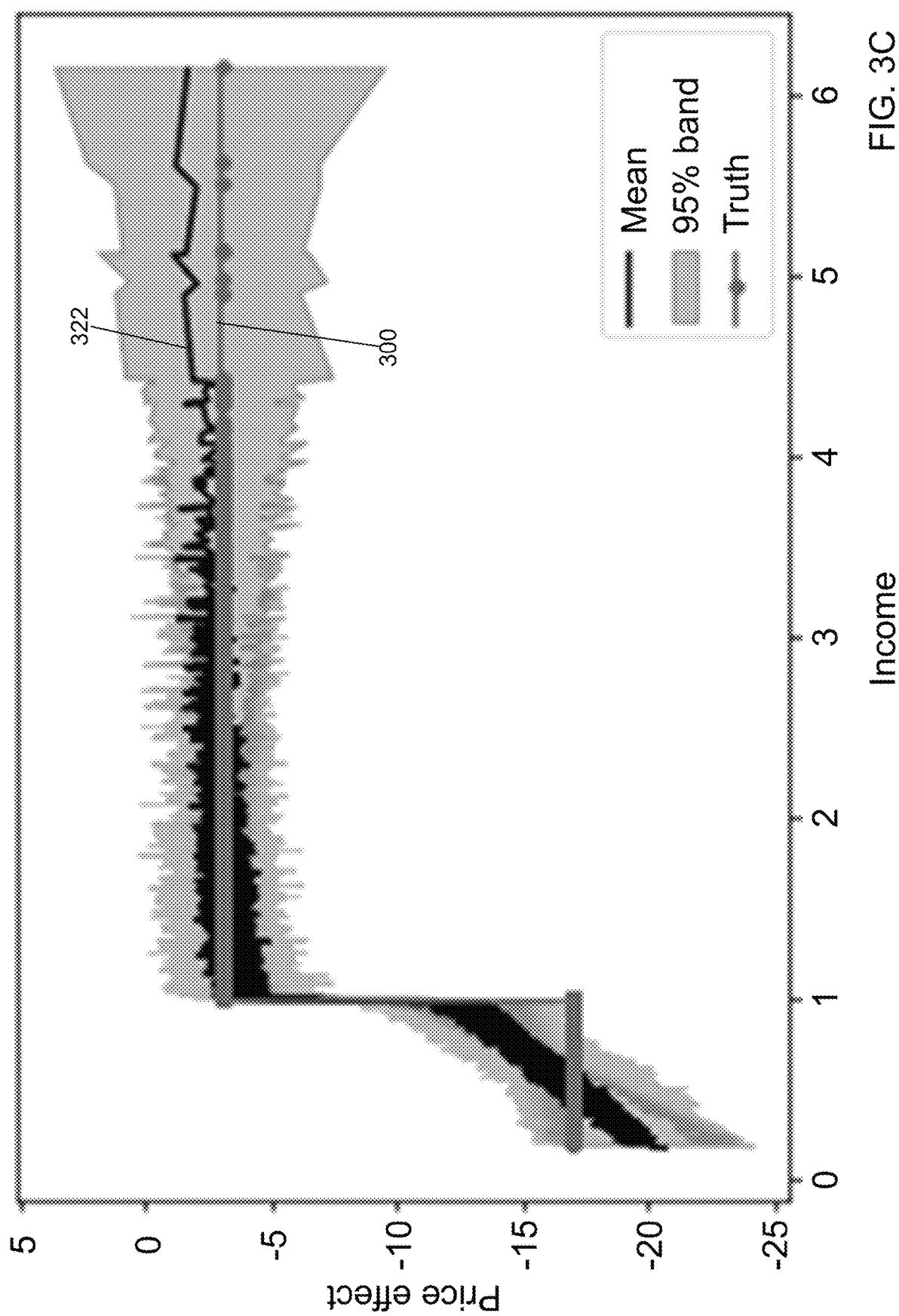

BAYESIAN NEURAL NETWORK POINT ESTIMATOR

CROSS-REFERENCE TO RELATED APPLICATIONS

The present application claims the benefit of and priority under 35 U.S.C. § 119(e) to U.S. Provisional Patent Application No. 63/460,015 filed Apr. 17, 2023, the entire contents of which are hereby incorporated by reference.

BACKGROUND

Causal inference is an important and active field in both academia and industry. Causal inference identifies causes, measures their effects, and directs policy making. Since randomized controlled trials are often expensive or even impossible, the causal effect may be estimated from observational data. There are several technical difficulties to do so, especially in the big-data world. For example, there may be a large number of potential covariates; there may be unknown nonlinear relationships between those covariates and an outcome variable and a treatment variable, and the variables may be discrete, continuous, or mixed. Though existing methods may be used to obtain point estimates of the individual effects, the existing methods are unable to quantify an uncertainty associated with those individual effects.

SUMMARY

In an example embodiment, a computer-readable medium is provided having stored thereon computer-readable instructions that when executed by a computing device, cause the computing device to compute a point estimate value for an individual using a Bayesian neural network model. A first Bayesian neural network (BNN) model that includes a plurality of connected neural network layers is trained using a plurality of observation vectors and a first random seed value. Each layer of the plurality of connected neural network layers includes a plurality of neurons. Each observation vector includes covariate variable values for a plurality of covariate variables and a statistical parameter variable value for a statistical parameter variable. The trained first BNN model computes a weight mean value, a weight standard deviation value, a bias mean value, and a bias standard deviation value for each neuron of the plurality of neurons. A plurality of BNN models is instantiated using the trained first BNN model. Instantiating each BNN model of the plurality of BNN models includes computing a weight value for each neuron using the weight mean value, the weight standard deviation value, and a weight random draw from a predefined weight error parameter distribution function of a respective neuron and computing a bias value for each neuron using the bias mean value, the bias standard deviation value, and a bias random draw from a predefined bias error parameter distribution function of the respective neuron. Each instantiated BNN model of the plurality of instantiated BNN models is executed with the plurality of observation vectors to compute an estimated statistical parameter value for each observation vector of the plurality of observation vectors. A point estimate value is computed for each observation vector of the plurality of observation vectors from the estimated statistical parameter value computed for each instantiated BNN model of the plurality of instantiated BNN models and for each observation vector of the plurality of observation vectors. The computed point estimate value is output for each observation vector of the plurality of observation vectors.

In another example embodiment, a computing device is provided. The computing device includes, but is not limited to, a processor and a computer-readable medium operably coupled to the processor. The computer-readable medium has instructions stored thereon that, when executed by the processor, cause the computing device to compute a point estimate value for an individual using a Bayesian neural network model.

In yet another example embodiment, a method of computing a point estimate value for an individual using a Bayesian neural network model is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 3C shows a price effect with an associated credible interval computed using five models trained using the training application of FIG. 2 in accordance with an illustrative embodiment.

DETAILED DESCRIPTION

Figure 1:
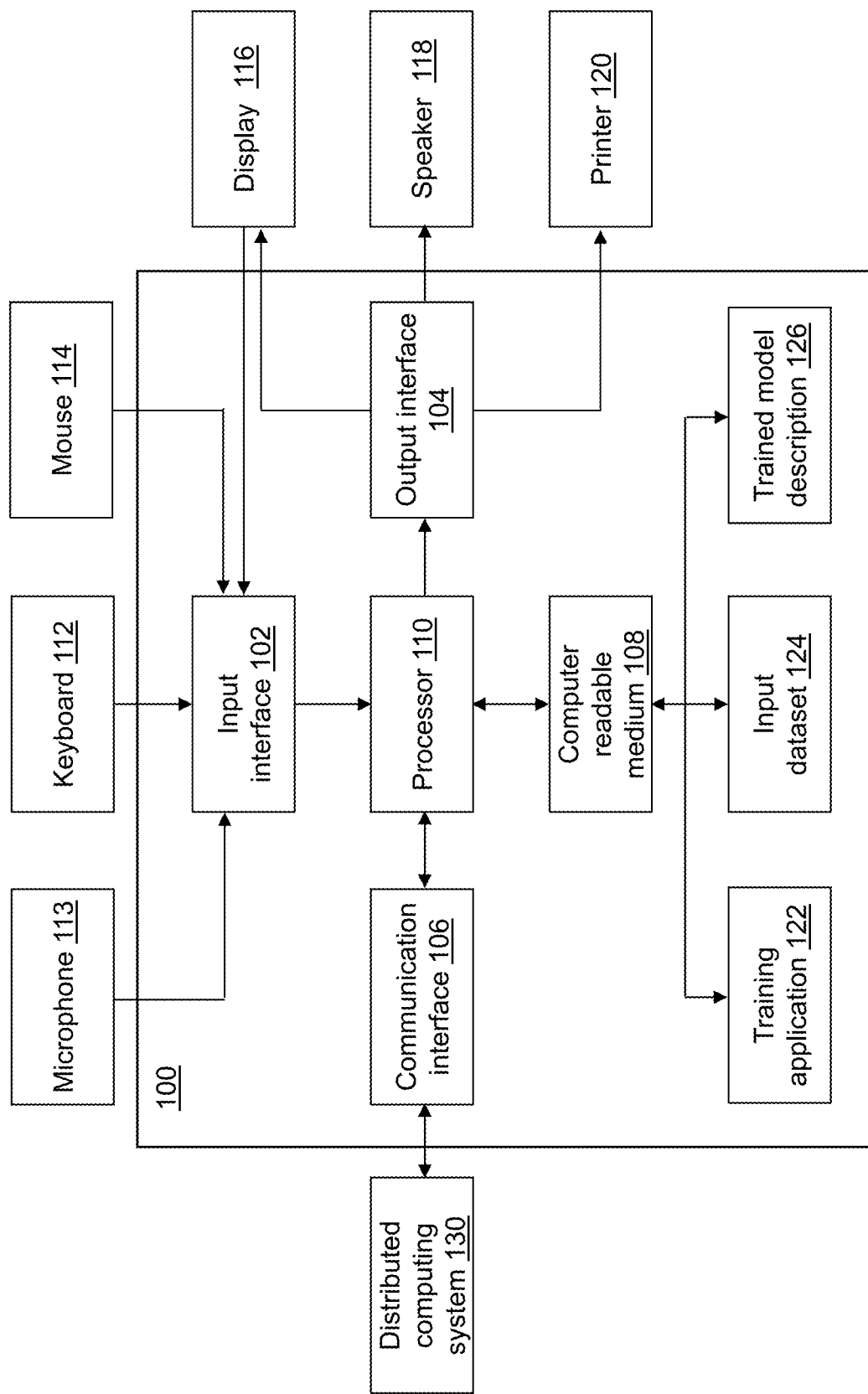
FIG. 1 depicts a block diagram of a model training device in accordance with an illustrative embodiment.

Patients and customers are inherently heterogeneous. They differ widely in terms of their age, gender, income, genetics, etc., and such variability can affect how they respond, for example, to a treatment or to a price increase. An understanding of individual responses to treatments or marketing offerings is needed to make informed, individualized treatment decisions. A standard approach to modeling observed heterogeneity in response to treatments is to specify individual-specific treatment effects as functions of observed individual characteristics. While a known functional form could be used, there are issues related to a large number of individual characteristics, as is the case in big-data applications, and the true unknown functional form might be highly nonlinear. In a paper by M. H. Farrell, et al. titled *Deep Learning for Individual Heterogeneity: An Automatic Inference Framework* and published in 2021 (the Farrell paper) and in U.S. Pat. No. 11,354,566 that issued Jun. 7, 2022, a semi-parametric framework is used for flexibly modeling heterogeneity where the treatment effects are specified as unknown functions of observed individuals' characteristics, and Deep Neural Networks (DNNs) are used to estimate the unknown functions. The framework described in the Farrell paper covers various popular models such as linear regression and discrete response models of the form: $E[Y|X=x, T=t]=G(\theta_0(x)t)$, where $G(.)$ is known. The framework described in the Farrell paper uses influence functions and asymptotic theory to obtain inference on the average of quantities of interest defined as functions of the individual effects (e.g., average price or dose effect, average price elasticity, average consumer surplus, etc.). The framework described in the Farrell paper has been implemented for a continuous outcome variable in a DEEPCAUSAL Procedure and a DEEPPRICE Procedure when the treatment variable is binary and continuous, respectively. The DEEPCAUSAL Procedure and the DEEPPRICE Procedure are included in SAS® Econometrics software developed and provided by SAS Institute Inc. of Cary, North Carolina, USA.

A paper by Kyle Colangelo and Ying-Ying Lee titled *Double Debiased Machine Learning Nonparametric Inference with Continuous Treatments* and published in 2022 (the Colangelo paper) considered fully nonparametric models where the outcome is specified as an unknown function of individual characteristics and treatment $(Y=g(T,X,\epsilon))$ with no functional form assumption on $g(.)$. The framework described in the Colangelo paper uses a kernel-based double debiased machine learning approach and asymptotic theory to conduct inference on the average dose-response function $\beta_t=E[Y(t)]=\int g(t,X,\epsilon)dF_{Xe}$ and partial effect $$\frac{\partial \beta_t}{\partial t}.$$

The problem with the framework described in the Farrell paper and the framework described in the Colangelo paper is that inference for individual treatment effects is not available. Point estimates of the heterogeneous (individual) effects can be obtained using the framework described in the Farrell paper, but it is impossible to quantify uncertainty associated with those individual effects. Both frameworks focus on quantifying uncertainty associated with selected average quantities of interest. For personalized medicine or pricing, individual effects or conditional average treatment effects are of the most interest. In personalized medicine, individual treatment effects, conditional average treatment effects, and individual potential outcome can help doctors determine whether a certain drug will be effective in treating a particular individual or group of individuals, or calculate the personalized dosage for a given individual or group of individuals. In personalized pricing, firms can offer a special price to each buyer or determine which type of individuals to target with special offers via loyalty programs based on factors like purchase history, online search behavior, location, etc. In customized marketing, firms can deliver targeted advertisements based on online and offline consumer interactions.

A training application 122 (shown referring to FIG. 1) adopts a Bayesian approach to the framework described in the Farrell paper and the framework described in the Colangelo paper. Bayesian Neural Networks (BNNs) are implemented for individual heterogeneity and causal inference by representing weights and biases of the neural networks, which may be deep neural networks (DNNs), as distributions instead of single points. The Bayesian paradigm overcomes some of the limitations of the asymptotic inference and the influence function approach, and offers several advantages: (1) uncertainty associated with heterogeneous (individual) effects or any quantity of interest defined as a function of heterogeneous effects is easily obtained; (2) prior distributions for weights and biases act as implicit regularization and help avoid overfitting, especially with small datasets; (3) an ensemble of networks can be trained in parallel to approximate multimodal posterior distributions and is more robust to changes in weight initialization and stochastic optimization path; and (4) BNNs correctly quantify uncertainty associated with average dose-response functions where the framework described in the Colangelo paper fails.

For illustration, consider the semiparametric model $y_i=\alpha(x_i)+\beta(x_i)t_i+v_i$, where $(t,x)$ and $y$ are inputs and output, respectively. The goal is to use DNNs for estimation and inference of the parameter functions $\alpha(x_i)$ and $\beta(x_i)$, where $x_i$ represents an observation vector for an individual, and $t_i$ represents a treatment for an individual. The DNN may be represented mathematically as $$\text{Layer}_0 = (x)$$

$$\text{Layer}_l = \text{Activation}(W_l \text{Layer}_{l-1} + b_l), l = 1, \ldots, L-2$$

$$(\alpha(x), \beta(x)) = \text{Activation}(W_{L-1}\text{Layer}_{L-2}),$$

$$y = \text{Activation}(\alpha(x) + \beta(x)t).$$

(W,b) are the parameters of the network and are learned in traditional DNNs using a backpropagation algorithm. A single value is estimated for each parameter.

A paper by Charles Blundell, et al. titled *Weight Uncertainty in Neural Networks* and published in Proceedings of the 32nd International Conference on Machine Learning, ser. Proceedings of Machine Learning Research, volume 37 at pages 1613-1622 in 2015 (the Blundell paper) proposed an algorithm Bayes by Backprop as a backpropagation-compatible algorithm for learning a probability distribution of the weights in DNNs. Building on the Bayes by Backprop algorithm described in the Blundell paper, a paper by Laurent Valentin Jospin, et al., titled *Hands-On Bayesian Neural Networks—A Tutorial for Deep Learning Users* and published in IEEE Computational Intelligence Magazine, volume 17, number 2 at pages 29-48 in 2022 (the Jospin paper) provided an overview of Bayesian neural network literature and offered a toolset using toy examples to implement various algorithms including Bayes by Backprop for BNNs.

In BNNs, the weights W and biases b are represented by probability distributions (priors) instead of having fixed values, and a Bayesian algorithm that may include Markov chain Monte Carlo (MCMC) or variational inference (VI) to estimate the distributions of the weight W and bias b for each neuron of the neural network are described in the Jospin paper. However, the Jospin paper and references therein focus on obtaining predictions in classification and regression tasks, and not on estimation. BNNs have not been applied to heterogeneity estimation or causal inference.

Training application 122 uses a BNN system for heterogeneity estimation in general and for causal inference. Given a prior on (W,b), MCMC algorithms can be used to sample from their posterior distributions, but they don't scale with the size of the model. VI is attractive in this context. When $\mathcal{D}=(y,x,t)$, VI approximates a complex posterior distribution $p(W, b|\mathcal{D})$ by a more tractable variational distribution, $q(W, b|\theta)$ chosen ($\theta$ is learned) to minimize the Kullback-Leibler (KL) divergence between the true posterior $p(W, b|\mathcal{D})$ and $q(W, b|\theta)$ given as:

$$D_{KL}(q(W, b|\theta)\|p(W, b|\mathcal{D})) = \int q(W, b|\theta)\log\frac{q(W, b|\theta)}{p(W, b)p(\mathcal{D}|W, b)}dWdb.$$

To ensure that backpropagation works, b and W are transformed as: $b=h(\theta_b, \epsilon_b)$ and $W=h(\theta_W, \epsilon_W)$ such that $b=h(\theta_b, \epsilon_b)\sim q(b|\theta_b)$ and $W=h(\theta_W, \epsilon_W)\sim q(W|\theta\theta_W)$, where $\epsilon_b\sim q(\epsilon_p)$ and $\epsilon_W\sim q(\epsilon_W)$ are nonvariational sources of noise. $\theta=(\theta_b, \theta_W)$. The Blundell paper showed that with this transformation, the KL optimization problem is equivalent to minimizing the cost function $f(W, b, \theta)=\log(q(W,b|\theta))-\log(p(\mathcal{D})|W, b))-\log(p(W,b))$. BNN then consists of implementing the traditional backpropagation algorithm with this cost function.

The BNN system can be used to estimate any model of observed heterogeneity outside of the causal inference field that flexibly specifies individual-specific parameters as unknown functions of observed covariates. Examples include linear regression and discrete response models used in various fields (Marketing, Economics, Social Sciences). Table 1 below provides a list of some models by outcome model. The treatment model can be of any type.

TABLE 1

| Outcome model | |
| --- | --- |
| Linear regression<br>Continuous | $E[Y_i|X = x_i, T = t_i] = \alpha(x_i) + \beta(x_i)t_i$ |
| Logistic regression<br>Binary (0, 1) | $Prob(Y_i = 1 \mid X = x_i, T = t_i) = \dfrac{\exp(\alpha(x_i) + \beta(x_i)t_i)}{1 + \exp(\alpha(x_i) + \beta(x_i)t_i)}$ |
| Multinomial Logit<br>(0, 1, 2, ... , J)<br>$t_i$ differs across individuals,<br>not across choices | $Prob(Y_i = j \mid X = x_i, T = t_i) = \dfrac{\exp(\alpha_j(x_i) + \beta_j(x_i)t_i)}{1 + \sum_{r=1}^{J}\exp(\alpha_r(x_i) + \beta_r(x_i)t_i)}$ |
| Conditional Multinomial<br>Logit (0, 1, 2, ... , J)<br>$t_i$ differs across individuals<br>and choices | $Prob(Y_i = j \mid X = x_i, T = t_{ij}) = \dfrac{\exp(\alpha(x_i) + \beta(x_i)t_{ij})}{\sum_{r=1}^{J}\exp(\alpha(x_i) + \beta(x_i)t_{ir})}$ |
| Poisson regression<br>Counts (0, 1, 2, ... ) | $E[Y_i|X = x_i, T = t_i] = \exp(\alpha(x_i) + \beta(x_i)t_i)$ |

The BNN framework is used to provide point estimates and uncertainty associated with the individual-specific structural parameters $\alpha_j(x_i)$ and $\beta(x_i)$ as well as any nonlinear combination of the structural parameters such as marginal effects $$\frac{\partial Prob(Y_i = j)}{\partial t_{ij}} = Prob(Y_i = j)(1 - Prob(Y_i = j))\beta(x_i)$$

and elasticities $$\frac{\partial \log(Prob(Y_i = j))}{\partial \log(t_{ij})} = t_{ij}(1 - Prob(Y_i = j))\beta(x_i).$$

A paper by Fan Li, et al., titled *Bayesian Causal Inference: A Critical Review* and published by The Royal Society Publishing in 2022 provides a review of the Bayesian approach to causal inference (the Li paper). The Li paper covers both parametric models (linear regressions) and nonparametric and machine learning models (regression trees) and emphasizes the importance of incorporating observation weights in the Bayesian inference (as is the case in the frequentist approach). Training application 122 uses DNNs to estimate flexible parameter functions. A BNN framework overcomes high-dimensionality challenges often encountered in nonparametric and semiparametric models, or models with many covariates.

BNNs for causal inference may use inverse probability treatment weighting (IPTW) to balance measured confounders across levels of treatment with treatment weight. A treatment model is fitted using DNNs $E[T_i|x_i]=g(x_i)$ and the observation weights are calculated using $$s_i = \exp\left(\frac{(t_i - \hat{g}(x_i))^2}{2n^{-1}\sum_{j=1}^{n}(t_j - \hat{g}(x_j))^2}\right)$$

for each individual. An outcome model as a BNN is trained with the IPTW-weighted likelihood function in the cost function:

$$C(W, b, \theta) =$$
$$\log(q(W, b \mid \theta)) - \log\left(\prod_{i=1}^{n} p(y_i \mid x_i, t_i, W, b)^{s_i}\right) - \log(p(W, b)).$$

Referring to FIG. 1, a block diagram of a model training device 100 is shown in accordance with an illustrative embodiment. Model training device 100 may include an input interface 102, an output interface 104, a communication interface 106, a non-transitory computer-readable medium 108, a processor 110, training application 122, input dataset 124, and a trained model description 126. Fewer, different, and/or additional components may be incorporated into model training device 100.

Input interface 102 provides an interface for receiving information from the user or another device for entry into model training device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into model training device 100 or to make selections presented in a user interface displayed on display 116.

The same interface may support both input interface 102 and output interface 104. For example, display 116 comprising a touch screen provides a mechanism for user input and for presentation of output to the user. Model training device 100 may have one or more input interfaces that use the same or a different input interface technology. The input interface technology further may be accessible by model training device 100 through communication interface 106.

Output interface 104 provides an interface for outputting information for review by a user of model training device 100 and/or for use by another application or device. For example, output interface 104 may interface with various output technologies including, but not limited to, display 116, a speaker 118, a printer 120, etc. Model training device 100 may have one or more output interfaces that use the same or a different output interface technology. The output interface technology further may be accessible by model training device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Model training device 100 may have one or more communication interfaces that use the same or a different communication interface technology. For example, model training device 100 may support communication using an Ethernet port, a Bluetooth antenna, a telephone jack, a USB port, etc. Data and/or messages may be transferred between model training device 100 and another computing device of a distributed computing system 130 using communication interface 106.

Computer-readable medium 108 is a non-transitory electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Model training device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Model training device 100 also may have one or more drives that support the loading of a memory media such as a CD, DVD, an external hard drive, etc. One or more external hard drives further may be connected to model training device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming languages, scripting languages, assembly languages, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Model training device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Training application 122 performs operations associated with defining trained model description 126 from data stored in input dataset 124. Trained model description 126 may be used to predict a treatment value and/or an outcome value or other parameter of interest for data stored in a second dataset 824 (shown referring to FIG. 8). Some or all of the operations described herein may be embodied in training application 122. The operations may be implemented using hardware, firmware, software, or any combination of these methods.

Referring to the example embodiment of FIG. 1, training application 122 is implemented in software (comprised of computer-readable and/or computer-executable instructions) stored in computer-readable medium 108 and accessible by processor 110 for execution of the instructions that embody the operations of training application 122. Training application 122 may be written using one or more programming languages, assembly languages, scripting languages, etc. Training application 122 may be integrated with other analytic tools. As an example, training application 122 may be part of an integrated data analytics software application and/or software architecture such as that offered by SAS Institute Inc. of Cary, North Carolina, USA. Merely for illustration, training application 122 may be implemented using or integrated with one or more SAS software tools such as JMP®, Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Econometrics, SAS® Visual Analytics, SAS® Viya™, and SAS In-Memory Statistics for Hadoop®, etc. all of which are developed and provided by SAS Institute Inc. of Cary, North Carolina, USA. Data mining, statistical analytics, and response prediction are practically applied in a wide variety of industries to solve technical problems.

Training application 122 may be implemented as a Web application. For example, training application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Input dataset 124 may include, for example, a plurality of rows and a plurality of columns. The plurality of rows may be referred to as observation vectors or records (observations), and the columns may be referred to as variables. In an alternative embodiment, input dataset 124 may be transposed. The plurality of variables defines a vector $x_i$ for each observation vector i=1, 2, ..., n, where n is a number of the observation vectors included in input dataset 124. Input dataset 124 may include additional variables that are not included in the plurality of variables. One or more variables of the plurality of variables may describe a characteristic of a physical object such as a patient. The plurality of variables may further include a treatment variable $t_i$ and an outcome variable $y_i$.

In data science, engineering, and statistical applications, data often consists of multiple measurements (across sensors, characteristics, responses, etc.) collected across multiple time instances (patients, test subjects, etc.). These measurements may be collected in input dataset 124 for analysis and processing or streamed to model training device 100 as it is generated. Input dataset 124 may include data captured as a function of time for one or more physical objects. The data stored in input dataset 124 may be captured at different time points periodically, intermittently, when an event occurs, etc. Input dataset 124 may include data captured at a high data rate such as 200 or more observation vectors per second for one or more physical objects. One or more columns of input dataset 124 may include a time and/or date value. Input dataset 124 may include data captured under normal and abnormal operating conditions of the physical object.

The data stored in input dataset 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, North Carolina, USA. For example, data stored in input dataset 124 may be generated as part of the Internet of Things (IoT), where things (e.g., machines, devices, phones, sensors) can be connected to networks and the data from these things collected and processed within the things and/or external to the things before being stored in input dataset 124. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in input dataset 124.

The data stored in input dataset 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

Input dataset 124 may be stored on computer-readable medium 108 or on one or more computer-readable media of distributed computing system 130 and accessed by model training device 100 using communication interface 106, input interface 102, and/or output interface 104. Input dataset 124 may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Input dataset 124 may be stored using various data structures as known to those skilled in the art including one or more files of a file system, a relational database, one or more tables of a system of tables, a structured query language database, etc. on model training device 100 or on distributed computing system 130. Model training device 100 may coordinate access to input dataset 124 that is distributed across distributed computing system 130 that may include one or more computing devices. For example, input dataset 124 may be stored in a cube distributed across a grid of computers as understood by a person of skill in the art. As another example, input dataset 124 may be stored in a multi-node Hadoop® cluster. For instance, Apache™ Hadoop® is an open-source software framework for distributed computing supported by the Apache Software Foundation. As another example, input dataset 124 may be stored in a cloud of computers and accessed using cloud computing technologies, as understood by a person of skill in the art. The SAS® LASR™ Analytic Server may be used as an analytic platform to enable multiple users to concurrently access data stored in input dataset 124. The SAS Viya open, cloud-ready, in-memory architecture also may be used as an analytic platform to enable multiple users to concurrently access data stored in input dataset 124. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 2:
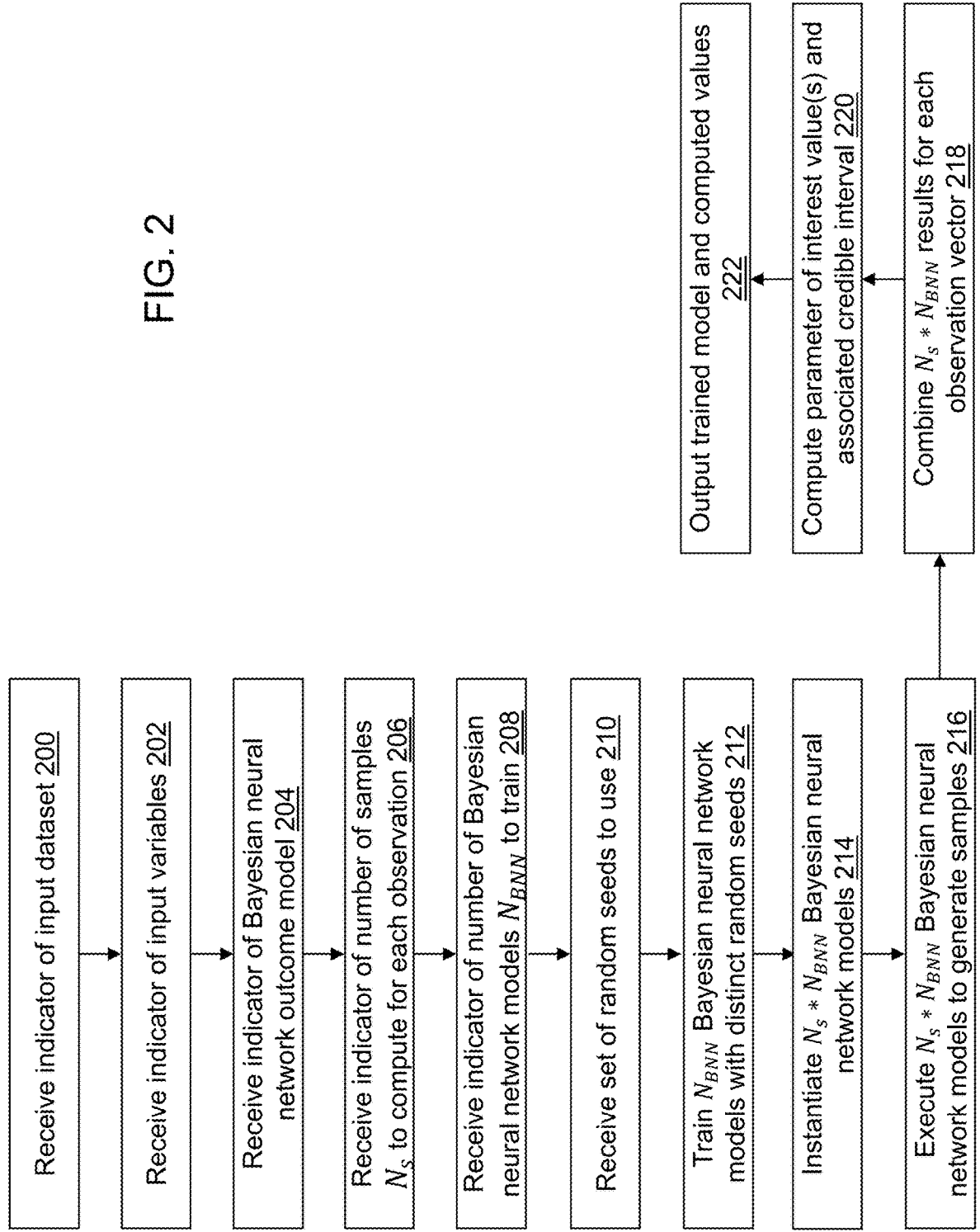
FIG. 2 depicts a flow diagram illustrating examples of operations performed by a training application of the model training device of FIG. 1 in accordance with an illustrative embodiment.

Referring to FIG. 2, example operations associated with training application 122 are described. Additional, fewer, or different operations may be performed depending on the embodiment of training application 122. The order of presentation of the operations of FIG. 2 is not intended to be limiting. Some of the operations may not be performed in some embodiments. Although some of the operational flows are presented in sequence, the various operations may be performed in various repetitions and/or in other orders than those that are illustrated. For example, a user may execute training application 122, which causes presentation of a first user interface window, which may include a plurality of menus and selectors such as drop-down menus, buttons, text boxes, hyperlinks, etc. associated with training application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by training application 122. The operations of training application 122 further may be performed in parallel using a plurality of threads and/or a plurality of worker computing devices.

In an operation 200, a first indicator may be received that indicates input dataset 124. For example, the first indicator indicates a location and a name of input dataset 124. As an example, the first indicator may be received by training application 122 after selection from a user interface window or after entry by a user into a user interface window. In an alternative embodiment, input dataset 124 may not be selectable. For example, a most recently created dataset may be used automatically. As understood by a person of skill in the art, input dataset 124 may be partitioned or otherwise divided into training, validation, and/or test datasets as part of training a neural network model and executing the trained neural network model to compute a performance score.

In an operation 202, a second indicator may be received that indicates a plurality of variables or features to include in training a BNN model using input dataset 124. For example, the second indicator may indicate column numbers or column names used to define each of a first set of covariates $x^{(1)}$, the treatment variable t, and the outcome variable y.

In an operation 204, a third indicator may be received to define an outcome model as a BNN. A default BNN may further be stored, for example, in computer-readable medium 108. For illustration, the BNN is defined by a plurality of layers and their connectivity including a type of each layer. Illustrative layers include an input layer, a convolution layer, a rectified linear activation function (ReLU) layer, a pooling layer, a parameter layer, an output layer, etc. A ReLU layer is a piecewise linear function that outputs the input directly if it is positive, and outputs zero otherwise. One or more hyperparameters may be defined for each layer that may vary based on a type of each layer. For example, an activation function, a number of neurons, a number of groups, a dropout rate, a height and/or a width of a convolution window, a number of filters, an initialization method for filter weights, width and height padding dimensions, etc. may be defined as hyperparameters for training the BNN. The BNN may be represented mathematically based on the example above $$\text{Layer}_0 = (x)$$

$$\text{Layer}_l = \text{Activation}(W_l \text{Layer}_{l-1} + b_l), l = 1, \ldots, L-2$$

$$(\alpha(x), \beta(x)) = \text{Activation}(W_{L-1} \text{Layer}_{L-2}),$$

$$y = \text{Activation}(\alpha(x) + \beta(x)t).$$

(W,b) are the parameters of the network. $(\alpha(x), \beta(x))$=Activation $(W_{L-1} \text{Layer}_{L-2})$ represents a parameter layer. W and b are represented by probability distributions (priors): p(W, b). Their true posterior distribution p(W,b|y,x,t) is approximated by a more tractable variational distribution, q (W, b|θ) that is estimated using a stochastic variational Bayes by backprop algorithm as described in the Blundell paper. q(W,b|θ) is defined as W=$\mu_W$+$\sigma_W \epsilon_W$, b=$\mu_b$+$\sigma_b \epsilon_b$, $\epsilon_b$, $\epsilon_W$~N (0,1), $$\theta = (\mu_b, \mu_W, \sigma_b, \sigma_W) = \text{argmin} D_{KL}(q(W, b \mid \theta) \| p(W, b \mid y, x, t)),$$

where N(0,1) represents a normal distribution with mean value of zero and standard deviation value of one, $\mu_b$, $\mu_W$, $\sigma_b$, $\sigma_W$, $\epsilon_b$, $\epsilon_W$ indicate a mean vector for the bias values, a mean vector for the weight values, a standard deviation vector for the bias values, a standard deviation vector for the weight values, an error parameter vector for the bias values, and an error parameter vector for the weight values, respectively. Each vector has a number of entries defined by the number of neurons included in the BNN. Again, the BNN is trained with the IPTW-weighted likelihood function in the cost function:

$$C(W, b, \theta) = \log(q(W, b \mid \theta)) - \log\left(\prod_{i=1}^{n} p(y_i \mid x_i, t_i, W, b)^{s_i}\right) - \log(p(W, b))$$

when there is a treatment model defined for causal effect.

In an operation 206, a fourth indicator of a number of samples $N_s$ may be received. The number of samples $N_s$ defines a number of samples for the neural network parameters (W,b) to compute using the BNN outcome model to create $N_s$ unique outcome models. In an alternative embodiment, the fourth indicator may not be received. For example, a default value may be stored, for example, in computer-readable medium 108 and used automatically. In another alternative embodiment, the value for the number of samples $N_s$ may not be selectable. Instead, a fixed, predefined value may be used. For illustration, a default value for the number of samples $N_s$ may be $N_s=100$ though other values may be used. The number of samples $N_s$ is greater than one.

In an operation 208, a fifth indicator of a number of BNNs $N_{BNN}$ to train may be received. The number of BNNs $N_{BNN}$ defines a number of BNNs to train using distinct random seeds so that the trained models are independent or distinct from each other. In an alternative embodiment, the fifth indicator may not be received. For example, a default value may be stored, for example, in computer-readable medium 108 and used automatically. In another alternative embodiment, the value for the number of BNNs $N_{BNN}$ may not be selectable. Instead, a fixed, predefined value may be used. For illustration, a default value for the number of BNNs $N_{BNN}$ may be $N_{BNN}=5$ though other values may be used. For example, $N_{BNN}$ may be equal to one.

In an operation 210, a sixth indicator of a set of random seeds to use to train the BNNs may be received. For example, a unique random seed may be indicated for each BNN to be trained. In an alternative embodiment, the sixth indicator may not be received. For example, a default set of values may be stored, for example, in computer-readable medium 108 and used automatically. In another alternative embodiment, the value for the set of random seeds may not be selectable. Instead, a fixed, predefined set may be used.

In an operation 212, the $N_{BNN}$ outcome models as defined in operation 208 are trained with the observation vectors read from input dataset 124 using different random seeds from the set of random seeds indicated in operation 210. The $N_{BNN}$ outcome models may be trained in parallel using a plurality of threads or a plurality of computing devices where a unique random seed is associated with each training process. The values $\mu_{W_{i,k}}$, $\sigma_{W_{i,k}}$, $\mu_{b_{i,k}}$, $\sigma_{b_{i,k}}$, $i=1, \ldots, N_n$, $k=1, \ldots, N_{BNN}$ are defined for each neuron of each trained outcome model, where $N_n$ indicates the number of neurons included in the BNN outcome model indicated in operation 204. $\mu_{W_{i,k}}$ may refer to a weight mean value, $\sigma_{W_{i,k}}$ may refer to a weight standard deviation value, $\mu_{b_{i,k}}$ may refer to a bias mean value, and $\sigma_{b_{i,k}}$ may refer to a bias standard deviation value for an $i^{th}$ neuron of the $k^{th}$ BNN.

In an operation 214, $N_s*N_{BNN}$ trained BNN outcome models are instantiated. Weight $W_{j,k}$ and bias $b_{j,k}$ vectors are defined for each of the $N_s*N_{BNN}$ trained BNN outcome models, where each vector has a number of entries defined by $N_n$, and $j=1, \ldots, N_s$, $k=1, \ldots, N_{BNN}$ such that a weight value and a bias value are defined for each neuron of each sample of each trained distinct model. Each weight value and each bias value is computed using $W_{i,j,k}=\mu_{W_{i,k}}+\sigma_{W_{i,k}}\epsilon_{W_{i,j,k}}$, $i=1, \ldots, N_n$, $j=1, \ldots, N_s$, $k=1, \ldots, N_{BNN}$ and $b_{i,j,k}=\mu_{b_{i,k}}+\sigma_{b_{i,k}}\epsilon_{b_{i,j,k}}$, $i=1, \ldots, N_n$, $j=1, \ldots, N_s$, $k=1, \ldots, N_{BNN}$, respectively, where i indicates a specific neuron of a respective trained BNN, j indicates a specific sample of the $N_s$ samples of the respective trained BNN, and k represents the respective trained BNN of the $N_{BNN}$ outcome models. $\epsilon_b$, $\epsilon_W$ are a predefined bias error parameter distribution function and predefined weight error parameter distribution functions, respectively. $\epsilon_{W_{i,j,k}}$ is an error parameter value drawn from the predefined weight error parameter distribution function of the $i^{th}$ neuron of the $j^{th}$ sample of the $k^{th}$ BNN, and $\epsilon_{b_{i,j,k}}$ is an error parameter value drawn from the predefined bias error parameter distribution function of the $i^{th}$ neuron of the $j^{th}$ sample of the $k^{th}$ BNN. The predefined error parameter distribution functions may be distribution models predefined by a user or in training application 122. The $N_s*N_{BNN}$ outcome models may be instantiated in parallel using a plurality of threads or a plurality of computing devices.

In an operation 216, each of the $N_s*N_{BNN}$ instantiated BNN outcome models is executed with the observation vectors read from input dataset 124. The $N_s*N_{BNN}$ outcome models may be executed in parallel using a plurality of threads or a plurality of computing devices.

In an operation 218, the statistical parameter variable value y from the output layer and/or any parameters from the parameter layer, such as $\alpha(x)$ and $\beta(x)$, that result from each execution in operation 216 are combined for each observation vector. For example, there are $N_s*N_{BNN}$ statistical parameter variable values $y_i$, $N_s*N_{BNN}$ values $\alpha_{j,k}(x_i)$, $j=1, \ldots, N_s$, $k=1, \ldots, N_{BNN}$, and $N_s*N_{BNN}$ values for $\beta_{j,k}(x_i)$, $j=1, \ldots, N_s$, $k=1, \ldots, N_{BNN}$ generated for each observation vector included in input dataset 124, where $x_i$ indicates the $i^{th}$ observation vector given the illustrative neural network model definition provided in the discussion of operation 204.

In an operation 220, one or more statistical parameter of interest values and their associated credible interval values are computed based on a predefined percent value such as 95% as understood by a person of skill in the art. The percent value may be predefined by a user or as a fixed value. For example, a point estimate for the statistical parameter $\alpha(x)$ may be computed for each individual using $$\hat{\alpha}(x_i) = \frac{1}{N_s N_{BNN}} \sum_{k=1}^{N_{BNN}} \sum_{j=1}^{N_s} \alpha_{j,k}(x_i).$$

A point estimate for the outcome y(x) may be computed for each individual using $$\hat{y}(x_i) = \frac{1}{N_s N_{BNN}} \sum_{k=1}^{N_{BNN}} \sum_{j=1}^{N_s} y_{j,k}(x_i).$$

A point estimate for the statistical parameter $\beta(x)$ may be computed for each individual using $$\hat{\beta}(x_i) = \frac{1}{N_s N_{BNN}} \sum_{k=1}^{N_{BNN}} \sum_{j=1}^{N_s} \beta_{j,k}(x_i).$$

The credible interval is computed as percentiles of the combined values in a manner similar to computation of a confidence interval. For example, a 95% credible interval for the individual parameter $\alpha(x_i)$ is the interval (a,b) where a and b are, respectively, the $2.5^{th}$ and $97.5^{th}$ percentiles of the $N_s N_{BNN}$ sample values of $\alpha_{j,k}(x_i)$.

In an operation 222, the computed one or more parameter of interest values and their associated credible interval values and/or the trained BNN outcome model are output. For example, one or more of the trained BNN outcome models may be output to trained model description 126. The computed values may further be output to a table, to display 116, etc.

Figure 3A:
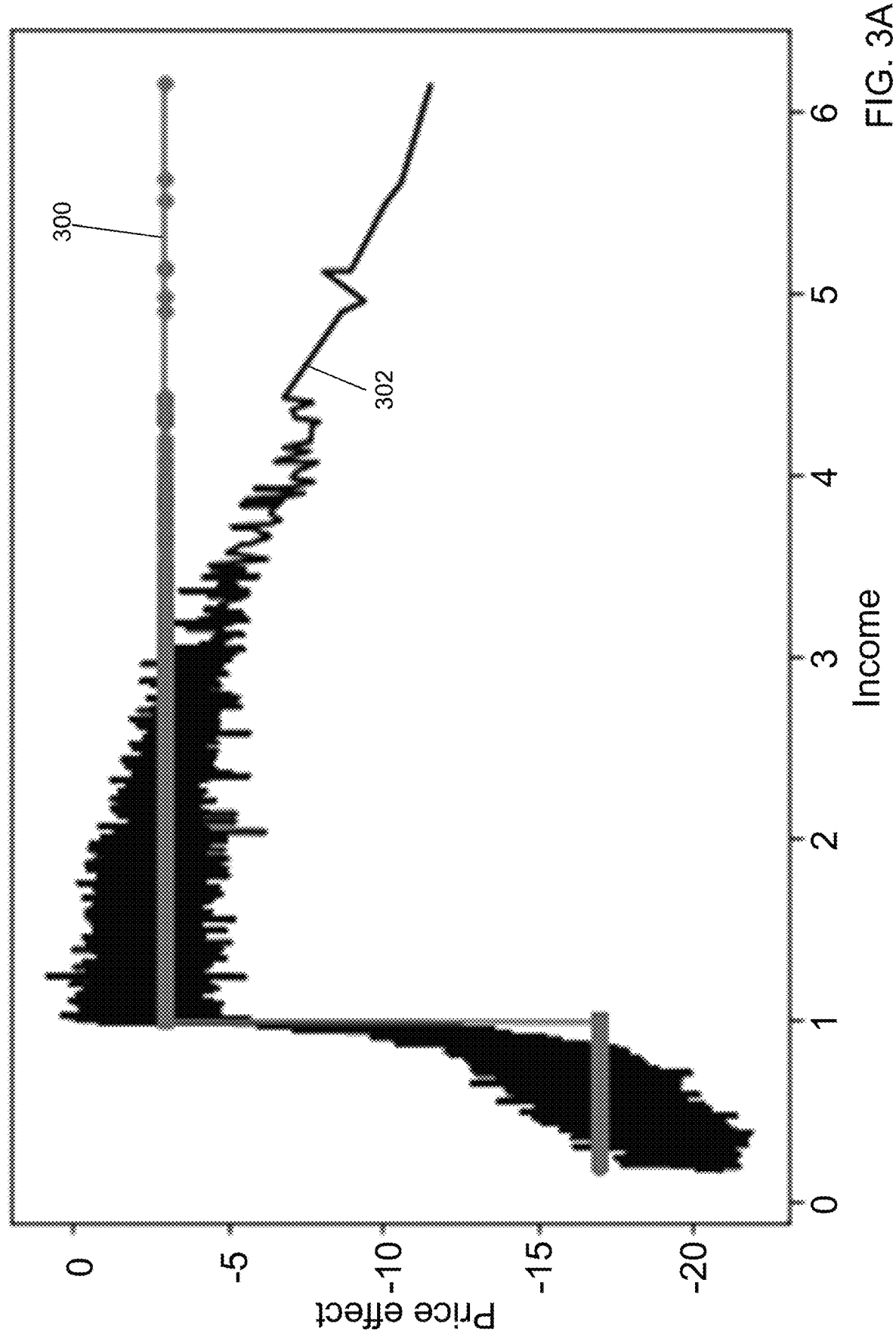
FIG. 3A provides a price effect computed using an existing method in accordance with an illustrative embodiment.

The Microsoft research project ALICE pricing data was used to train a single BNN and to train five independent BNNs using training application 122. The results were compared to those generated using the DEEPPRICE Procedure based on the framework described in the Farrell paper. Referring to FIG. 3A, the results are shown using the DEEPPRICE Procedure. The statistical parameter of interest in this example is the price elasticity changes over the income. A first statistical parameter curve 300 shows the true statistical parameter, and a second statistical parameter curve 302 shows the estimated statistical parameter. The uncertainty associated with individual slopes is not available when using the framework described in the Farrell paper.

Figure 3B:
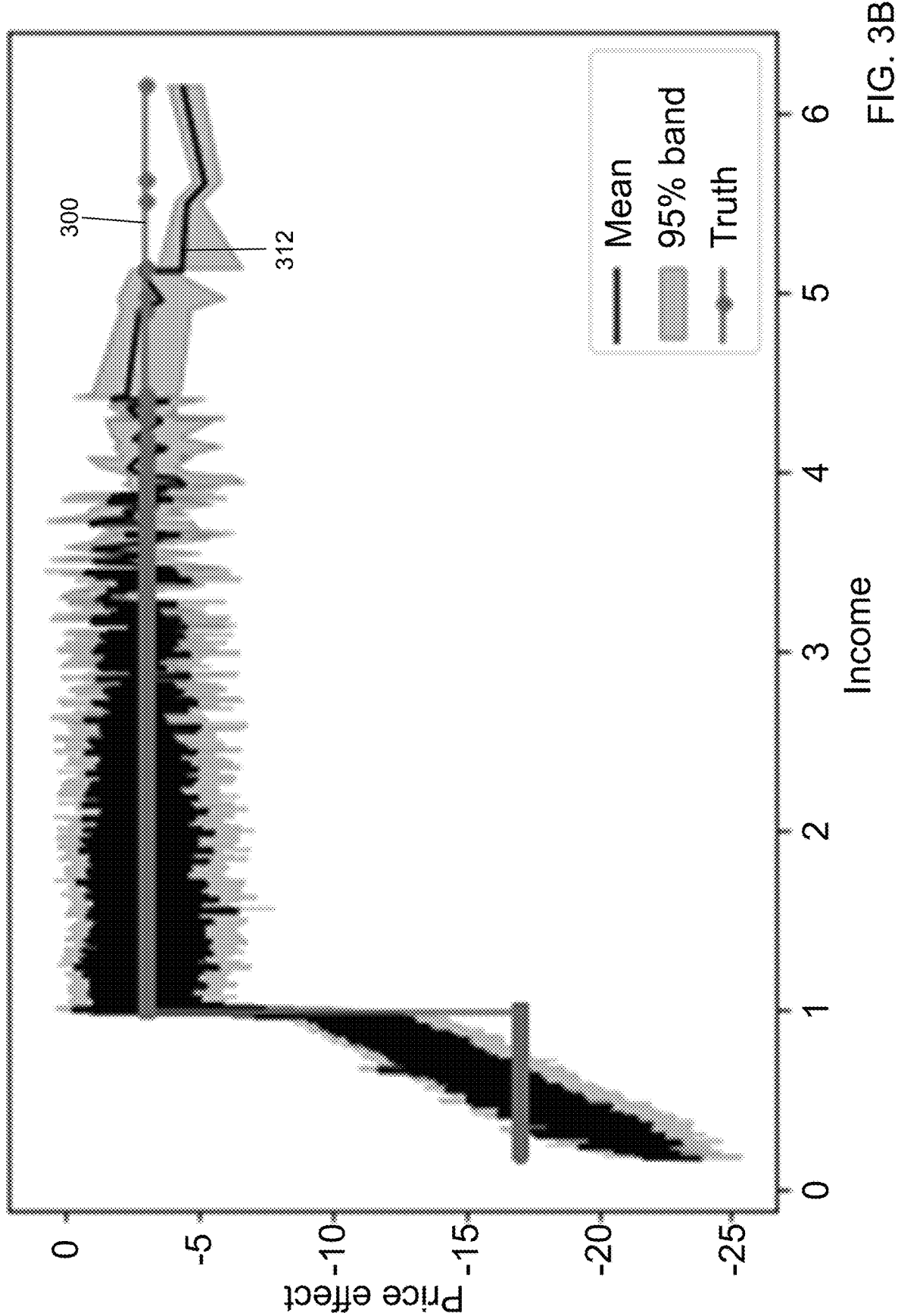
FIG. 3B shows a price effect with an associated credible interval computed using a single model trained using the training application of FIG. 2 in accordance with an illustrative embodiment.

Referring to FIG. 3B, a first average statistical parameter curve 312 shows the results using training application 122 with a single BNN in accordance with an illustrative embodiment. Referring to FIG. 3C, a second average statistical parameter curve 322 shows the results using training application 122 with five trained BNNs and 10,000 samples for each BNN in accordance with an illustrative embodiment. 95% credible intervals computed relative to the average value at each value of the income input parameter is also shown in FIGS. 3B and 3C. The BNN average intercept and slope estimates were similar to those obtained using the DEEPPRICE Procedure. The multiplicity of DNNs in the Bayesian approach results in the average statistical parameter being closer to the true value for higher income levels compared to using the DEEPPRICE Procedure. In addition, training BNNs with five networks results in better uncertainty quantification for low- and high-income levels compared to using a single network because the 95% credible interval band consistently includes the true value at each value of the income input parameter.

A case where the outcome variable y was binary and the treatment variable t was continuous was executed. In the randomly generated data, there are two covariates, and 20,000 observations were generated according to the following equations and distributions:

$$x = (x_1, x_2) \sim N\left(0, \Sigma = \begin{bmatrix} 1 & 0.5 \\ 0.5 & 1 \end{bmatrix}\right)$$

$$t \sim \text{LogNormal}(0.4, 1)$$

$$\alpha(x) = 1 - x_1^2$$

$$\beta(x) = x\theta, \theta_j = \frac{(-1)^{j-1}}{j^2}, j = 1, 2$$

$$\text{Prob}(y = 1|x, t) = \frac{\exp(\alpha(x) + \beta(x)t)}{1 + \exp(\alpha(x) + \beta(x)t)}$$

This experiment illustrates using the BNN system to estimate a logistic model of observed heterogeneity outside of the causal inference field that flexibly specifies individual-specific parameters as unknown functions of observed covariates. The BNN estimations were computed using two independent BNNs with 10,000 samples each of the structural parameter functions $\alpha(x)$ and $\beta(x)$.

Figure 4A:
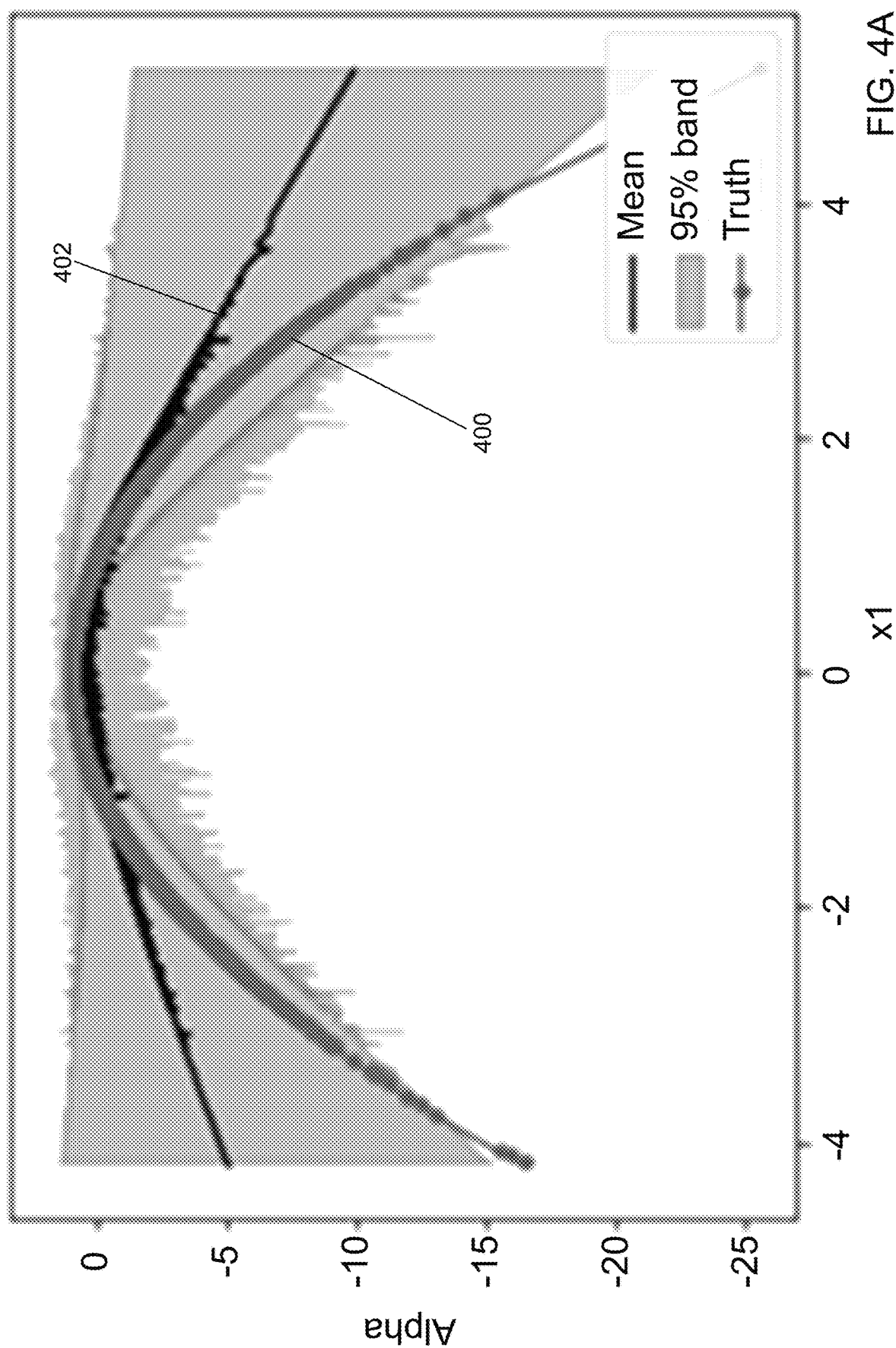
FIG. 4A provides a first statistical parameter with an associated credible interval as a function of a first input parameter computed using two models trained using the training application of FIG. 2 in accordance with an illustrative embodiment.
Figure 4B:
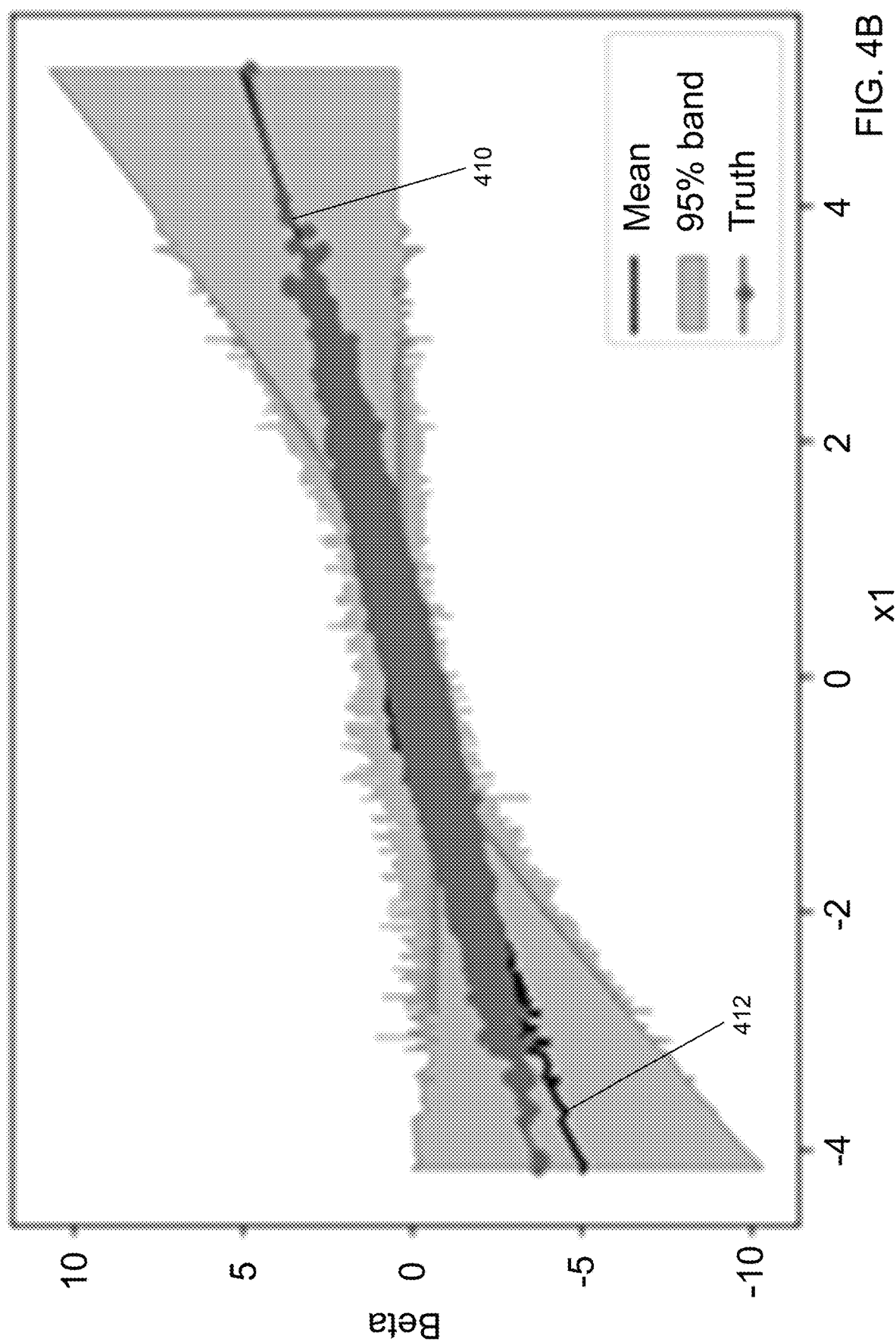
FIG. 4B provides a second statistical parameter with an associated credible interval as a function of the first input parameter computed using the two models of FIG. 4A in accordance with an illustrative embodiment.
Figure 4C:
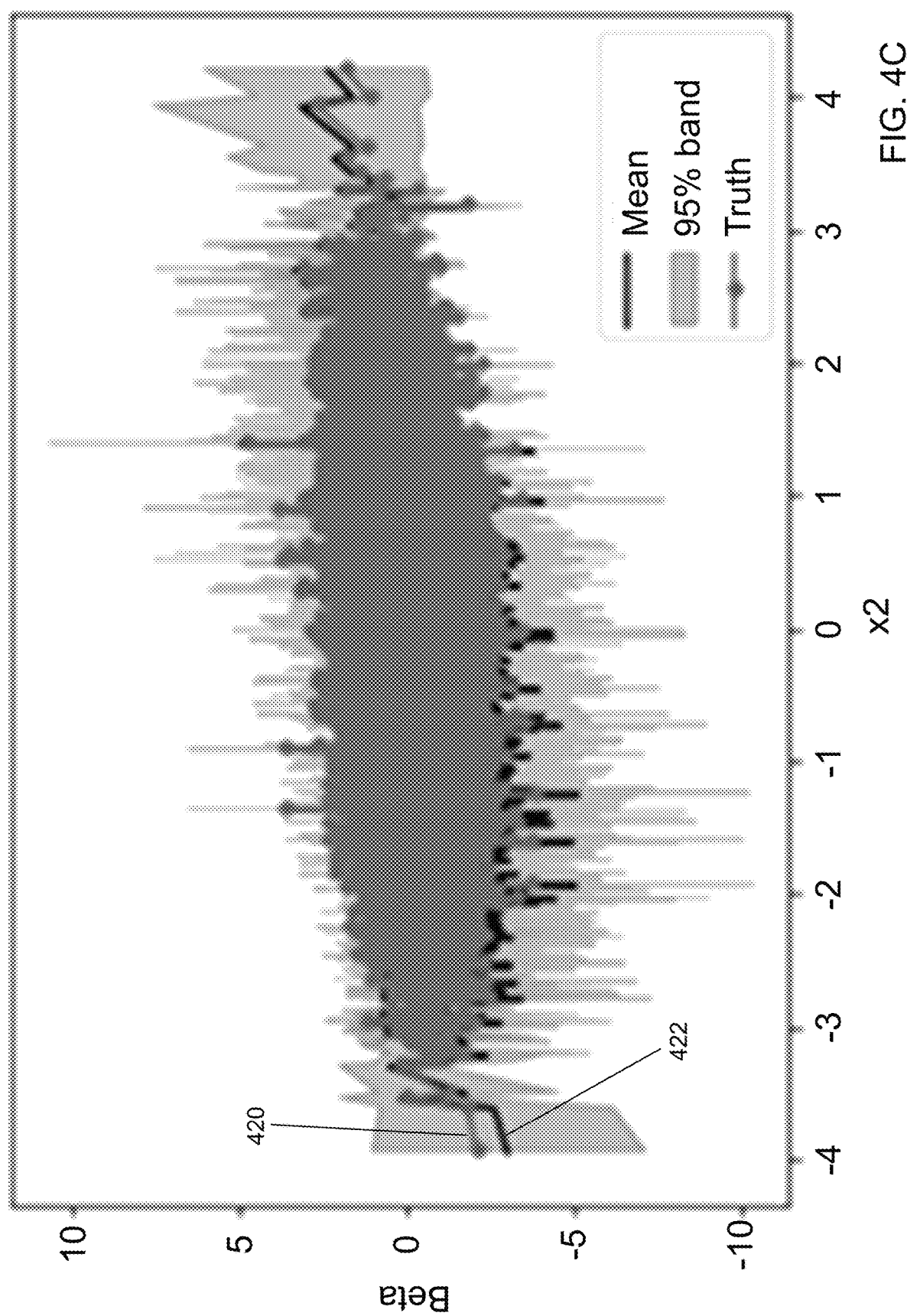
FIG. 4C provides the second statistical parameter with an associated credible interval as a function of a second input parameter computed using the two models of FIG. 4A in accordance with an illustrative embodiment.

Referring to FIG. 4A, a true $\alpha(x)$ curve 400 and an average $\alpha(x)$ curve 402 computed using the two trained BNNs are shown as a function of $x_1$ in accordance with an illustrative embodiment. The 95% credible interval computed relative to the average value at each value of $x_1$ is also shown. Referring to FIG. 4B, a true $\beta(x)$ curve 410 and an average $\beta(x)$ curve 412 computed using the two trained BNNs is shown as a function of $x_1$ in accordance with an illustrative embodiment. The 95% credible interval computed relative to the average value at each value of $x_1$ is also shown. Referring to FIG. 4C, a true $\beta(x)$ curve 420 and an average $\beta(x)$ curve 422 computed using the two trained BNNs is shown as a function of $x_2$ in accordance with an illustrative embodiment. The 95% credible interval computed relative to the average value at each value of $x_2$ is also shown. Training two BNNs results in good uncertainty quantification for each average point estimate computed.

Figure 5:
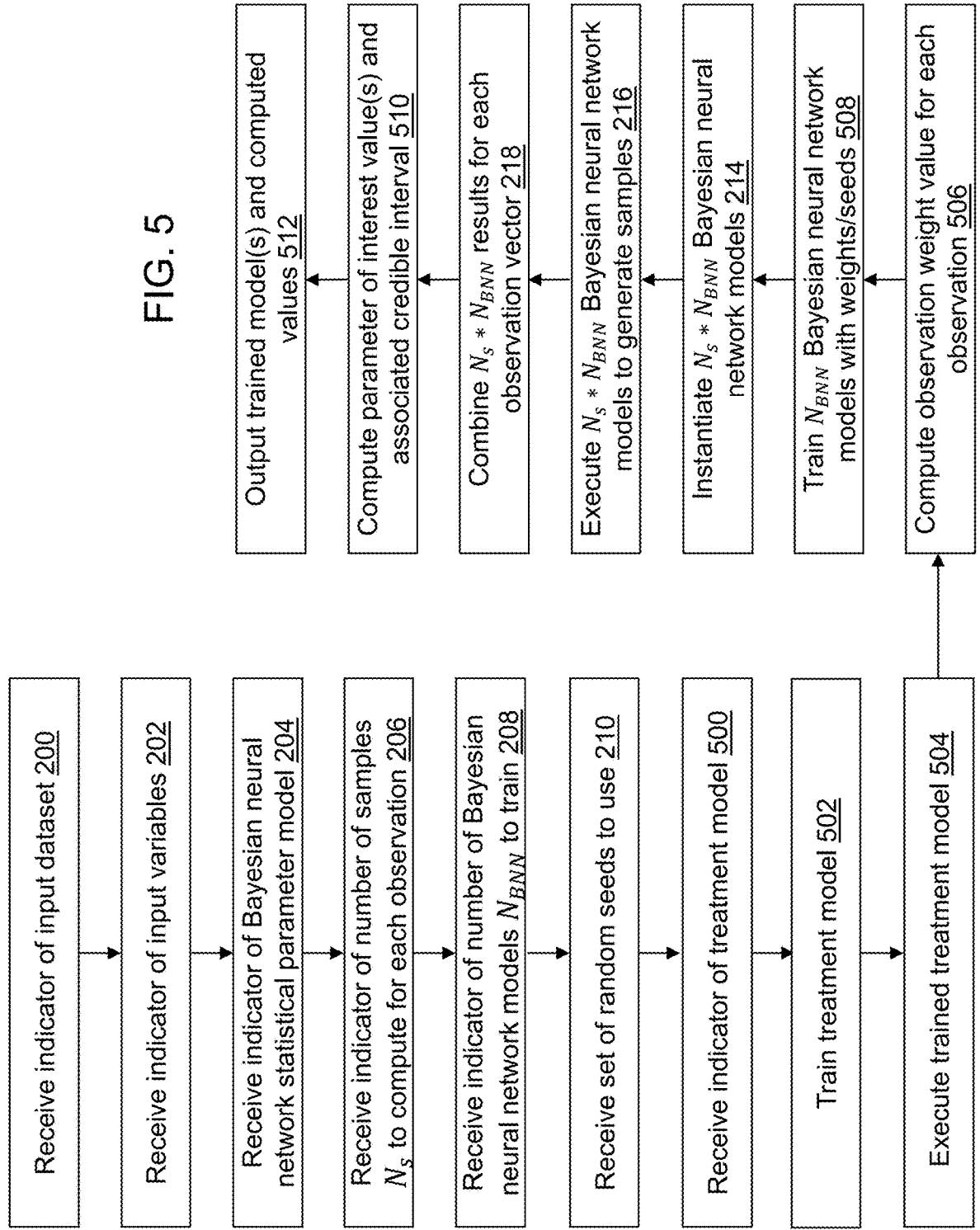
FIG. 5 depicts a flow diagram illustrating examples of operations performed by the training application of the model training device of FIG. 1 when used for causal inference in accordance with an illustrative embodiment.

Referring to FIG. 5, additional example operations associated with training application 122 are described when a treatment model is included for causal inference. Operations 200 through 210 may be performed where the same or a distinct set of treatment covariates may be identified in operation 202 for training the treatment model.

In an operation 500, a seventh indicator may be received for a treatment model. The treatment model may be any machine learning model. For example, the seventh indicator indicates a name of a treatment model type for the treatment model that performs prediction such as determining a predicted treatment or action to take for each observation vector of input dataset 124. The seventh indicator may be received by training application 122 from a user interface window or after entry by a user into a user interface window. A default value for the treatment model type may further be stored, for example, in computer-readable medium 108. As an example, the treatment model type may be selected from "SVM", "K-Cluster", "Neural Network", "Logistic Regression", "Forest", "Gradient Boosting", "Decision Tree", "Factorization Machine", "Deep Neural Network", etc. The model type indicated by "SVM" may refer to a support vector machine (SVM) model type. The model type indicated by "K-Cluster" may refer to a k-means clustering model type. The model type indicated by "Neural Network" may refer to a neural network model type. The model type indicated by "Logistic Regression" may refer to a logistic regression model type. The model type indicated by "Forest" may refer to a random forest model type. The model type indicated by "Gradient Boosting" may refer to a gradient boosting model type. The model type indicated by "Decision Tree" may refer to a decision tree model type. The model type indicated by "Factorization Machine" may refer to a factorization machine model type. The model type indicated by "Deep Neural Network" may refer to a deep neural network (DNN) machine model type. For example, a default model type may be indicated by "Deep Neural Network". Of course, the model type may be labeled or selected in a variety of different manners by the user as understood by a person of skill in the art. In an alternative embodiment, the model type may not be selectable, and a single model type is implemented by model training application 122. For example, the model type indicated as "Deep Neural Network" may be used by default or without allowing a selection. The model types "SVM", "K-Cluster", "Neural Network", "Logistic Regression", "Forest", "Gradient Boosting", "Decision Tree", "Factorization Machine", "Deep Neural Network" may be trained and scored using machine learning software developed and provided by SAS Institute Inc. of Cary, NC, USA.

The seventh indicator may further indicate one or more hyperparameters to use for training and validating the indicated model type and/or values for an automatic tuning method (autotune option) as well as other training options such an objective function, training stop criteria, etc. For illustration, an automatic tuning process is described in U.S. Pat. Nos. 10,360,517; 10,600,005; 10,832,174; and 11,093,833. Hyperparameters define values or various options that govern a training process based on the model type. The default values of these hyperparameters may not be suitable for all applications. To reduce the effort in adjusting these hyperparameters, an automatic tuning process may be used to identify the best settings for the hyperparameters though the hyperparameters may optionally be selected as an input option by a user.

For illustration, the treatment model may be trained to regress t on $x^{(1)}$ to estimate $\hat{t}$ for each observation vector using a DNN such that $\hat{t}=\hat{f}_{DNN}(x^{(1)})$. A default value for the DNN architecture may further be stored, for example, in computer-readable medium 108. For the treatment model, a negative log likelihood function is an illustrative loss function though other loss functions may be indicated or otherwise used. A deep learning action set provided as part of SAS® Viya developed and provided by SAS Institute Inc. of Cary, NC, USA may be used to build the treatment model and add layers to the treatment model. In general, the treatment model includes an input layer that provides $x^{(1)}$ to hidden layers with the same or a different number of nodes on each hidden layer. A last layer of the hidden layers provides input to an output layer that computes a predicted treatment value when the treatment variable is of the continuous or count type or a predicted probability of assigning the treatment or different treatment categorical values when the treatment variable is of the binary or discrete type.

In an operation 502, the treatment model defined in operation 500 is trained with a treatment variable value $t_i$ and covariate values for the first set of covariates $x_i^{(t)}$ read from input dataset 124 for each observation vector i of the n observation vectors. Alternatively, when a distinct set of treatment covariates is identified in operation 202 for training the treatment model, the treatment model defined in operation 500 is trained with a treatment variable value $t_i$ and covariate values for a second set of covariates $x_i^{(2)}$ read from input dataset 124 for each observation vector i of the n observation vectors. The training process optimizes the loss function based on the target variable that is the treatment variable t that includes a treatment value for each observation vector. In an illustrative embodiment, a double/debiased machine learning method such as that described in a paper by Victor Chernozhukov, et al. titled *Double/Debiased Machine Learning for Treatment and Structural Parameters* and published in The Econometrics Journal, volume 21, issue 1 on Feb. 1, 2018 on pages C1-C68 or a sample-split technique may be used. For example, the observation vectors in input dataset 124 may be divided randomly into k folds with an $i^{th}$ fold held out. The remaining (k−1) folds of observation vectors are used to train the treatment model and the $i^{th}$ fold of observation vectors is used to compute the estimated value to get $\hat{f}^{(i)}(.)$, i=1, . . . , k. All of the k fold estimations become $\hat{f}(.)$.

In an operation 504, the trained treatment model is executed with the covariate values for the first set of covariates $x^{(1)}$ or the second set of covariates $x^{(2)}$ read from input dataset 124 for each observation vector of the n observation vectors to estimate the treatment variable value $\hat{t}$ for each observation vector of the n observation vectors.

In an operation 506, an observation weight value si is computed for each observation vector of the n observation vectors. Various functions may be used to compute the observation weight value. For illustration, using IPTW when assuming that the treatment value follows a Gaussian distribution centered around an estimated treatment value, $$s_i = s(t_i, \hat{t}_i) = \exp\left(\frac{(t_i - \hat{t}_i)^2}{v}\right),$$

i=1, . . . , n, where v indicates a variance of the estimated treatment values. For example, $$v = \frac{1}{n}\sum_{k=1}^{n}(\hat{t}_i - t_i)^2.$$

The observation weight values further can be normalized or truncated.

In an operation 508, similar to operation 212, the $N_{BNN}$ outcome models as defined in operation 208 are trained with the observation vectors read from input dataset 124 that include the treatment variable value of the treatment variable using different random seeds from the set of random seeds indicated in operation 210. The loss function includes the observation weight value s; as C (W, b, θ)=log(q(W, b|θ))−log($\Pi_{i=1Z}^n$p($y_i|x_i$, $t_i$, W, b)$^{s_i}$)−log(p(W,b)).

Operations 214 through 218 may be performed with the trained BNN outcome models.

Similar to operation 220, in an operation 510, one or more statistical parameter of interest values and their associated credible interval values are computed based on a predefined percent value such as 95% as understood by a person of skill in the art. For example, an individual treatment effect may be computed for each individual using $$\tau_i = \frac{\partial \hat{y}(x_i, t_i)}{\partial t},$$

where $t_i$ indicates the treatment value read from input dataset 124 for the $i^{th}$ observation vector, and $$\hat{y}(x_i, t_i) = \frac{1}{N_s N_{BNN}}\sum_{k=1}^{N_{BNN}}\sum_{j=1}^{N_s} y_{j,k}(x_{ir}, t_i).$$

indicates the treatment output by the trained treatment model. The partial derivative of $\hat{y}(x_i, t_i)$ as a function of the treatment value may be computed using finite differences $$\hat{\tau}_i = \frac{\hat{y}(x_i, t+\epsilon) - \hat{y}(x_i, t-\epsilon)}{2\epsilon},$$

where $\epsilon$ is a predefined small number. An average treatment effect may be computed using $$\tau = \frac{1}{n}\sum_{k=1}^{n}\tau_i.$$

A conditional average treatment effect for individuals with covariate values $x_i \in A$ may be computed using $$\tau(A) = \frac{1}{|\{i:x_i \in A\}|} \sum_{(i:x_i \in A)} \frac{\partial \hat{y}(x_i, t_i)}{\partial t}.$$

An individual potential outcome for a treatment value T may be computed using $E[Y|x=x_i, t=T]=\hat{y}(x_i, T)$. An average potential outcome for the treatment value T may be computed using $$E[Y|t=T] = \frac{1}{n}\sum_{i=1}^{n} \hat{y}(x_i, T).$$

Marginal effects may be computed using $$\frac{\partial Prob(Y_i = j)}{\partial t_{ij}} = Prob(Y_i = j)(1 - Prob(Y_i = j))\beta(x_i),$$

and elasticities may be computed using $$\frac{\partial \log(Prob(Y_i = j))}{\partial \log(t_{ij})} = t_{ij}(1 - Prob(Y_i = j))\beta(x_i).$$

In an operation 512, the computed values, the trained treatment model, and/or one or more of the trained BNN outcome models may be output. For example, one or more of the trained BNN outcome models may be output to trained model description 126 possibly in addition to the trained treatment model. The computed values may further be output to a table, to display 116, etc.

A third experiment was based on the same simulation described in section 5.1 of the Colangelo paper:

$$t = \Phi(3X'\theta) + 0.75v - 0.5$$

$$y = 1.2t + 1.2X'\theta + t^2 + tX_1 + \varepsilon$$

where v~N(0,1), ε~N(0,1), X=(X$_1$, . . . , X$_{100}$)'~N(0,Σ), $$\theta_j = \frac{1}{j^2}, \text{diag}(\Sigma) = 1,$$

the (i,j)—entry $\Sigma_{ij}$=0.5 for |i−j|=1 and $\Sigma_{ij}$=0 for |i−j|>1 for i,j=1, . . . , 100, and φ is the cumulative distribution function of N(0,1). The fully nonparametric treatment and outcome models are T=ƒ(X) and Y=g(T,X), respectively, where ƒ(.) and g(.) are unknown functions. The goal is to estimate the average dose-responses $\beta_t$=E[Y(t)] for a grid of dose values. The true values are derived from the data generating process as: $\beta_t$=E[Y(t)]=1.2t+t². 10,000 observations were generated. $N_{BNN}$=5.

Figure 6A:
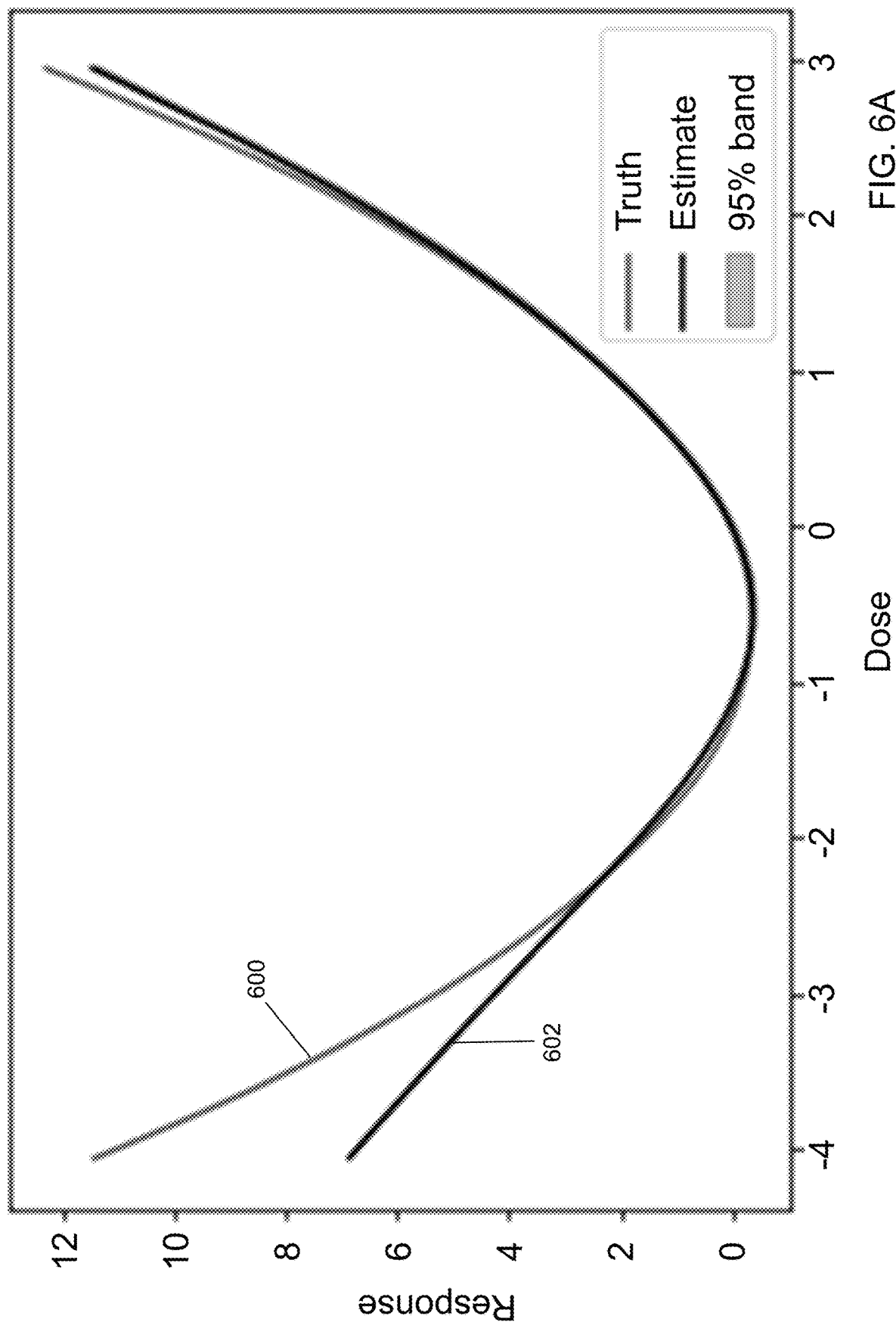
FIG. 6A provides a dose-response curve with an associated credible interval computed using the existing method for a first case in accordance with an illustrative embodiment.

Referring to FIG. 6A, the estimator results are shown using the estimator described in the Colangelo paper. A first response curve 600 shows the true response, and a first estimated response curve 602 shows the estimated response. Though not visible, a 95% confidence interval is shown meaning the pointwise confidence intervals obtained using the estimator described in the Colangelo paper was too narrow and did not contain the true average response for most dose values.

Figure 6B:
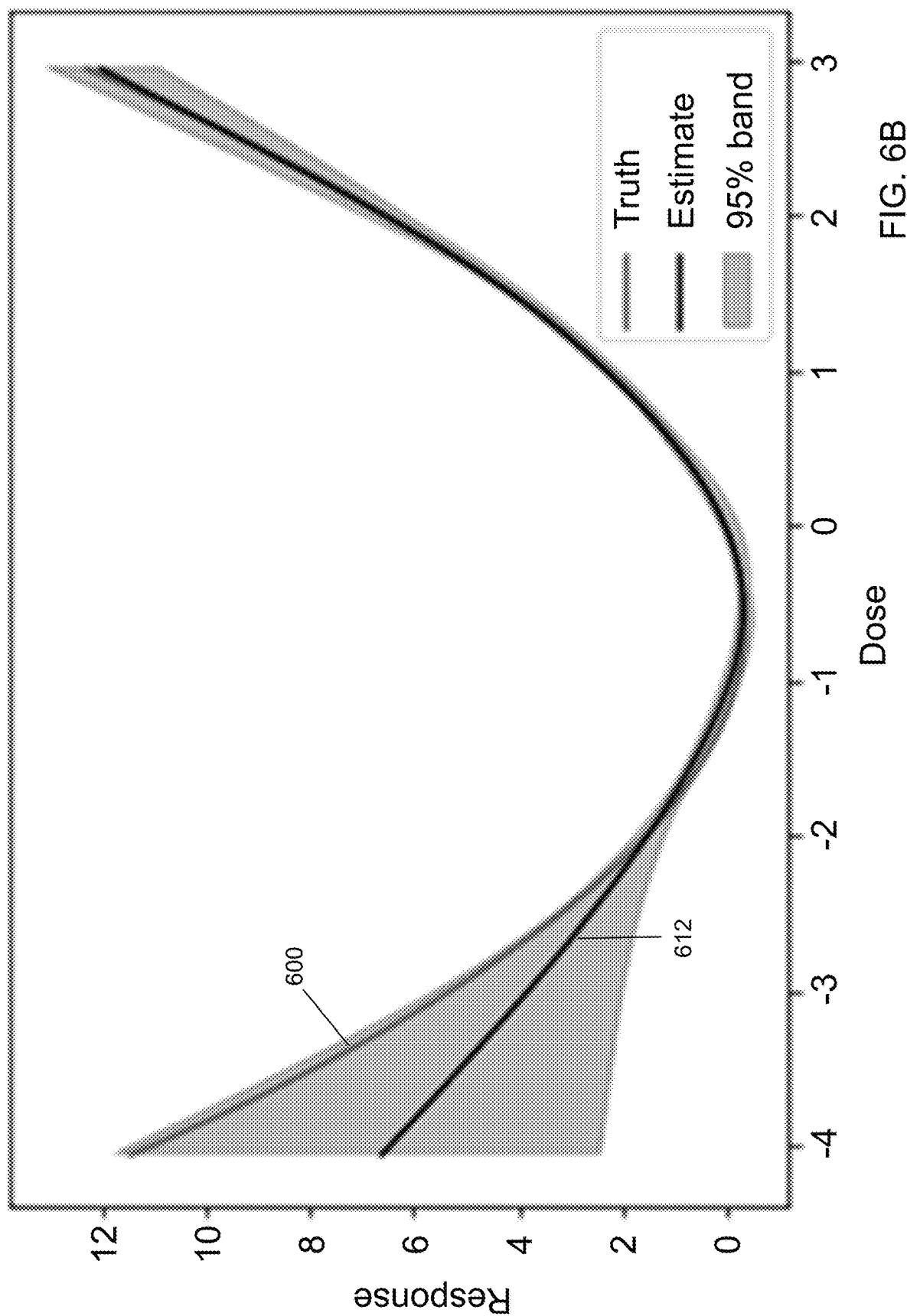
FIG. 6B shows a dose-response curve with an associated credible interval computed using five models trained using the training application of FIG. 5 for the first case in accordance with an illustrative embodiment.

Referring to FIG. 6B, the estimator results are shown using the ensembled five BNNs generated using training application 122. A second estimated response curve 612 shows the estimated response using the ensembled five BNNs. The credible interval is in gray for each treatment value (dose). The coverage rate for the 95% CI was 100% meaning that the estimator provided a much better representation of the credible interval.

Figure 6C:
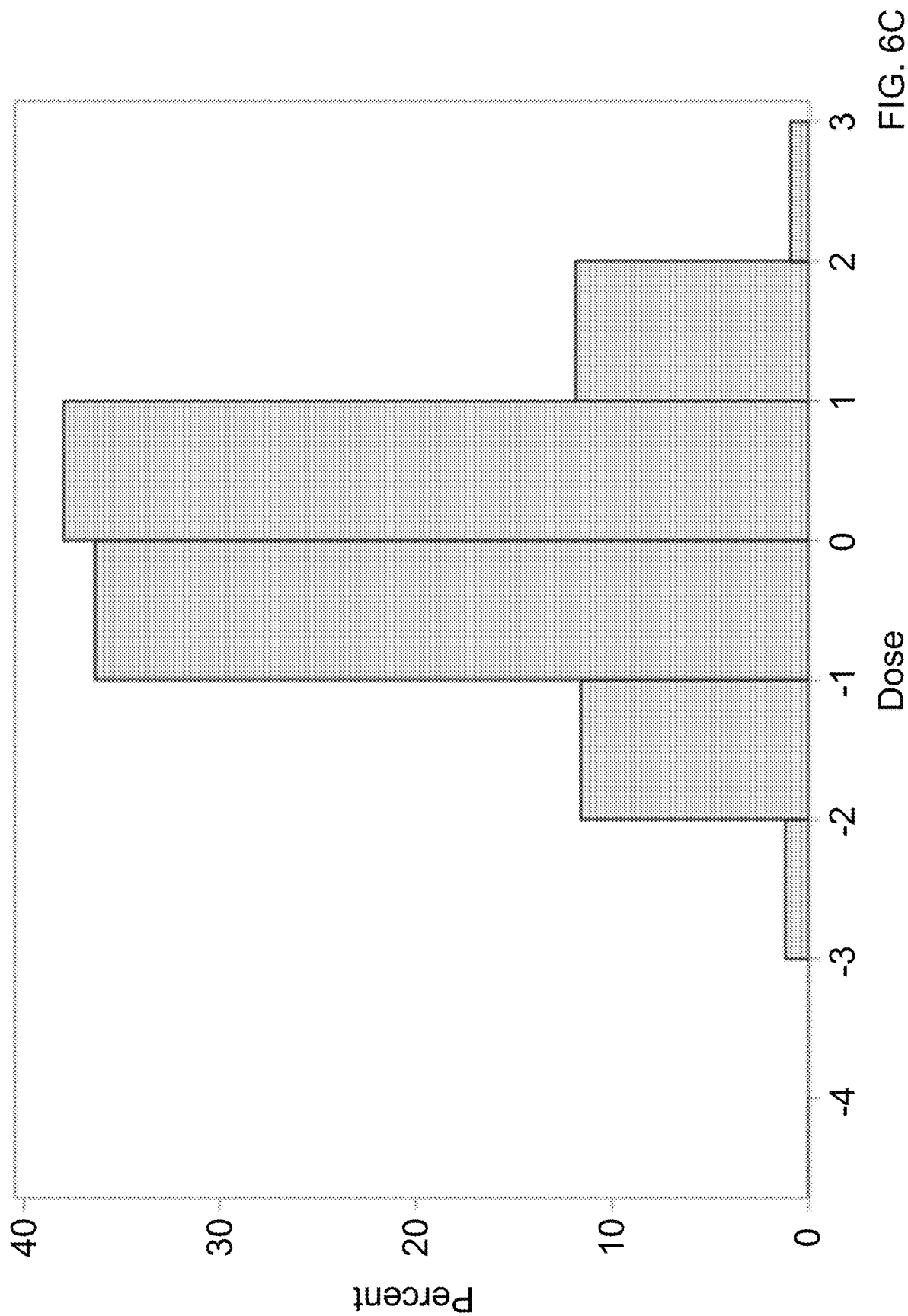
FIG. 6C shows a histogram of a dose distribution for the first case in accordance with an illustrative embodiment.

Referring to FIG. 6C, a histogram of a dose distribution for the 10,000 generated observations is shown. A desirable feature of BNNs is the uncertainty about predicted responses when there are very few data points. The credible interval corresponding to a dose value less than −3 is noticeably wider because 0.01% of the 10,000 generated observations fell in this interval. Despite the small amount of data, the 95% credible interval computed using training application 122 includes the true value.

A fourth experiment was based on:

$$t = (0.9\sin(\pi x_1) + 0.1u_1)x_2 + (0.7\sin(\pi x_1) + 0.3u_2)(1 - x_2)$$

$$a = (3.25 + 2(x_1 - 0.5))x_2 + (3 + 2(x_1 - 0.5))(1 - x_2)$$

$$b = (3 - 1(x_1 - 0.5))x_2 + (2.75 - 2(x_1 - 0.5))(1 - x_2)$$

$$y = 0.5 + 25(1 - x_1)e^{((a-1)\log(t) + (b-1)\log(1-t))} + \eta - 0.5$$

where $x_2$~Ber(0.5), $x_1$~U(0,1), $u_1$, $u_2$~U(0,1), η~U(0,1). The smaller the coefficients of $u_1$ and $u_2$, the smaller the randomness in the treatment model. The more the individual covariates play a role in the treatment assignment, the greater the selection bias. The fully nonparametric treatment and response models are t=ƒ($x_1$,$x_2$) and y=g(t,$x_1$,$x_2$), respectively, where ƒ(.) and g(.) are unknown functions. The goal is to estimate the average dose-responses $\beta_t$=E[y(t)] for a grid of dose values. Training application 122 was executed using 10,000 simulated observations. $N_{BNN}$=5.

Figure 7A:
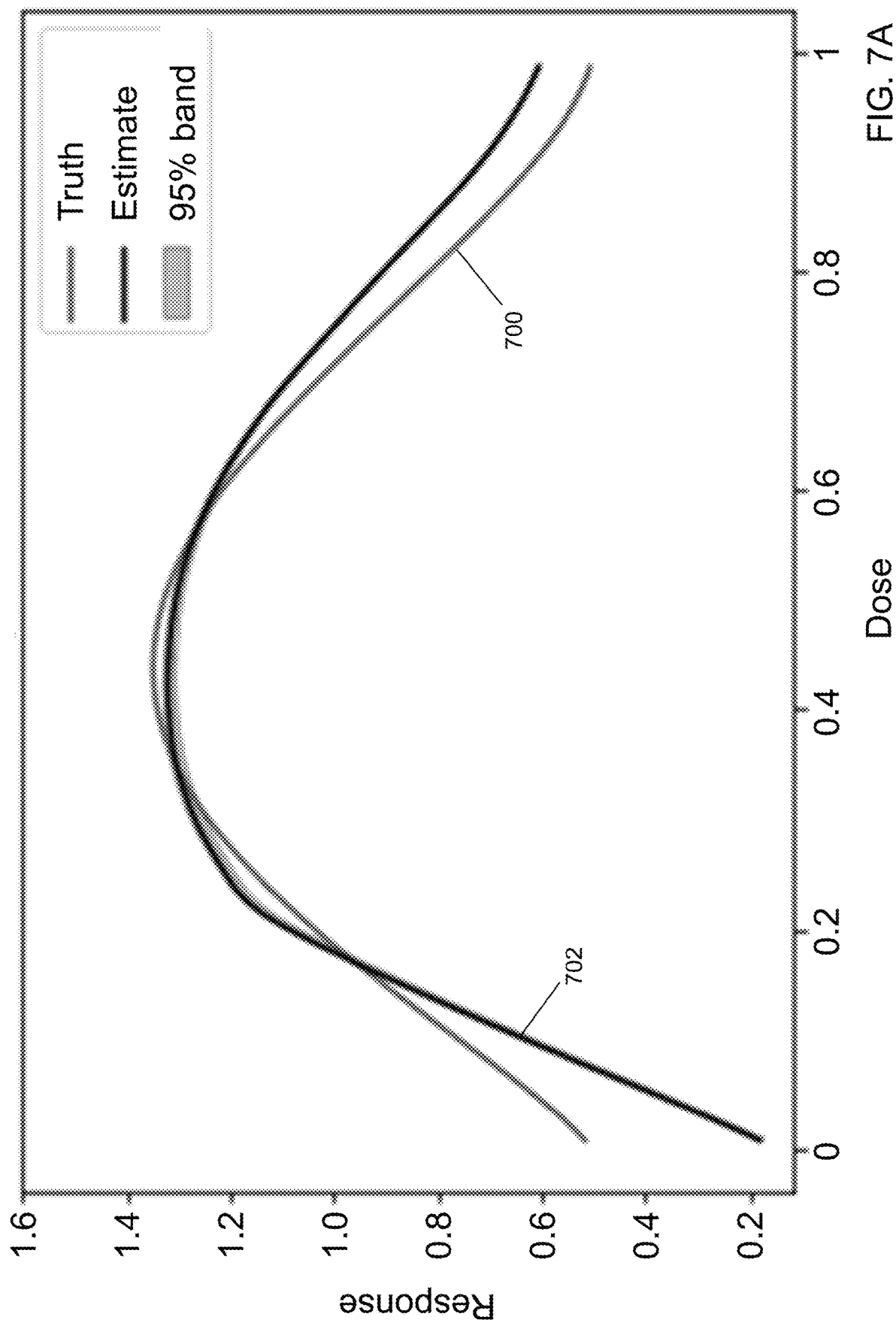
FIG. 7A provides a dose-response curve with an associated credible interval computed using the existing method for a second case in accordance with an illustrative embodiment.

Referring to FIG. 7A, the estimator results are shown using the estimator described in the Colangelo paper. A second response curve 700 shows the true response, and a third estimated response curve 702 shows the estimated response. Though not visible, a 95% confidence interval is shown meaning the pointwise confidence intervals obtained using the estimator described in the Colangelo paper was too narrow and did not contain the true average response for most dose values. The coverage rate for the 95% CI was 11%.

Figure 7B:
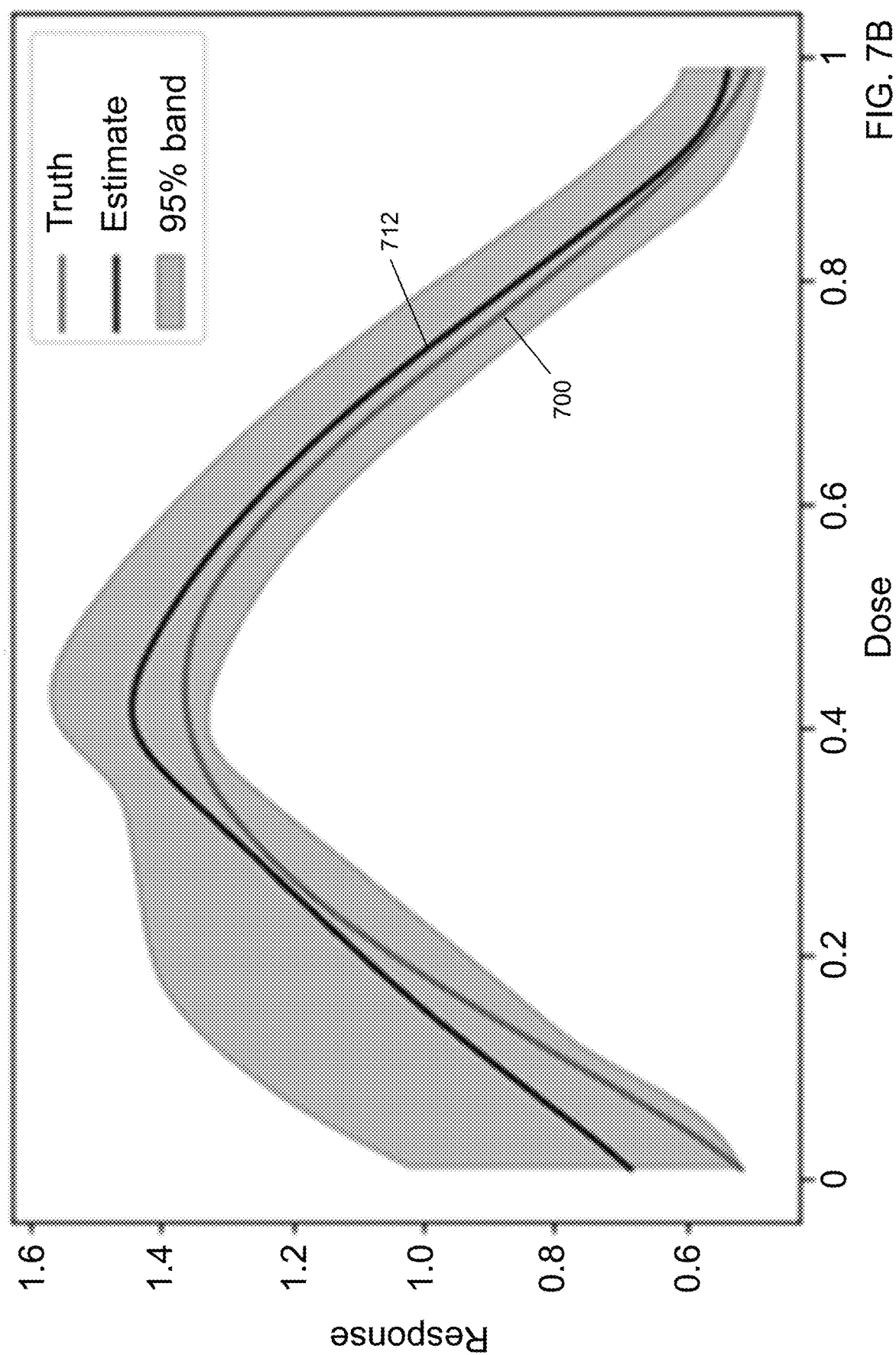
FIG. 7B shows a dose-response curve with an associated credible interval computed using five models trained using the training application of FIG. 5 for the second case in accordance with an illustrative embodiment.

Referring to FIG. 7B, the estimator results are shown using the ensembled five BNNs generated using training application 122. A fourth estimated response curve 712 shows the estimated response using the ensembled five BNNs. The credible interval is in gray for each treatment value (dose). The coverage rate for the 95% CI was 100% meaning that the estimator provided a much better representation of the credible interval. Clearly, the point estimates computed using training application 122 were more accurate and their 95% credible intervals have better coverage.

Figure 8:
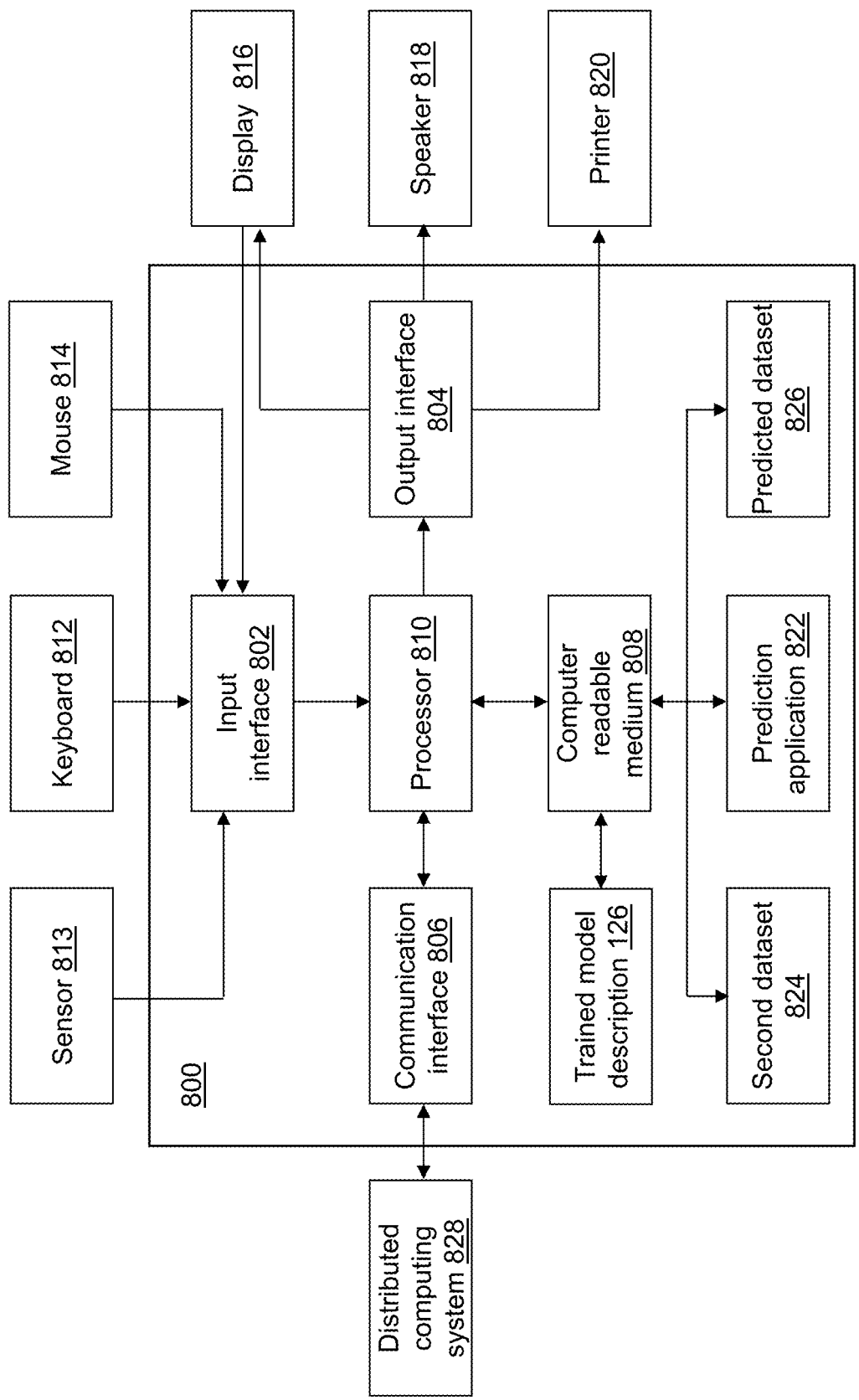
FIG. 8 depicts a block diagram of a prediction device in accordance with an illustrative embodiment.

Referring to FIG. 8, a block diagram of a prediction device 800 is shown in accordance with an illustrative embodiment. Prediction device 800 may include a second input interface 802, a second output interface 804, a second communication interface 806, a second non-transitory computer-readable medium 808, a second processor 810, a prediction application 822, trained model description 126, second dataset 824, and predicted dataset 826. Fewer, different, and/or additional components may be incorporated into prediction device 800. Prediction device 800 and model training device 100 may be the same or different devices.

Second input interface 802 provides the same or similar functionality as that described with reference to input interface 102 of model training device 100 though referring to prediction device 800. Second output interface 804 provides the same or similar functionality as that described with reference to output interface 104 of model training device 100 though referring to prediction device 800. Second communication interface 806 provides the same or similar functionality as that described with reference to communication interface 106 of model training device 100 though referring to prediction device 800. Data and messages may be transferred between prediction device 800 and a distributed computing system 828 using second communication interface 806. Distributed computing system 130 and distributed computing system 828 may be the same or different computing systems. Second computer-readable medium 808 provides the same or similar functionality as that described with reference to computer-readable medium 108 of model training device 100 though referring to prediction device 800. Second processor 810 provides the same or similar functionality as that described with reference to processor 110 of model training device 100 though referring to prediction device 800.

Prediction application 822 performs operations associated with predicting a treatment value and/or an outcome value for each observation vector included in second dataset 824. The predicted value may be stored in predicted dataset 826 to support various data analysis functions as well as provide alert/messaging related to each predicted value. Some or all of the operations described herein may be embodied in prediction application 822. The operations may be implemented using hardware, firmware, software, or any combination of these methods.

Referring to the example embodiment of FIG. 8, prediction application 822 is implemented in software (comprised of computer-readable and/or computer-executable instructions) stored in second computer-readable medium 808 and accessible by second processor 810 for execution of the instructions that embody the operations of prediction application 822. Prediction application 822 may be written using one or more programming languages, assembly languages, scripting languages, etc. Prediction application 822 may be integrated with other analytic tools. As an example, prediction application 822 may be part of an integrated data analytics software application and/or software architecture such as that offered by SAS Institute Inc. of Cary, North Carolina, USA. For example, prediction application 822 may be part of SAS® Enterprise Miner™ developed and provided by SAS Institute Inc. of Cary, North Carolina, USA. Merely for further illustration, prediction application 822 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Econometrics, SAS® Visual Analytics, SAS® Viya™, and SAS In-Memory Statistics for Hadoop®, all of which are developed and provided by SAS Institute Inc. of Cary, North Carolina, USA.

One or more operations of prediction application 822 further may be performed by an ESPE on an event stream instead of reading observation vectors from second dataset 824. Prediction application 822 and training application 122 may be the same or different applications that are integrated in various manners to train the treatment and/or outcome model(s) using input dataset 124 that may be distributed on distributed computing system 130 and to execute the trained treatment and/or outcome model(s) to predict the treatment value or the outcome value for each observation vector included in second dataset 824 that may be distributed on distributed computing system 828.

Prediction application 822 may be implemented as a Web application. Prediction application 822 may be integrated with other system processing tools to automatically process data generated as part of operation of an enterprise, to predict a treatment value or an outcome value, and/or to provide a warning or alert associated with the prediction using second input interface 802, second output interface 804, and/or second communication interface 806 so that appropriate action can be initiated in response. For example, a warning or an alert may be presented using a second display 816, a second speaker 818, a second printer 820, etc. or sent to one or more computer-readable media, display, speaker, printer, etc. of distributed computing system 828.

Input dataset 124 and second dataset 824 may be generated, stored, and accessed using the same or different mechanisms. The treatment variable and the outcome variable are not defined in second dataset 824. Similar to input dataset 124, second dataset 824 may include a plurality of rows and a plurality of columns with the plurality of rows referred to as observations or records, and the columns referred to as variables that are associated with an observation. Second dataset 824 may be transposed.

Similar to input dataset 124, second dataset 824 may be stored on second computer-readable medium 808 or on one or more computer-readable media of distributed computing system 828 and accessed by prediction device 800 using second communication interface 806. Data stored in second dataset 824 may be a sensor measurement or a data communication value, for example, from a sensor 813, may be generated or captured in response to occurrence of an event or a transaction, generated by a device such as in response to an interaction by a user with the device, for example, from a second keyboard 812 or a second mouse 814, etc. The data stored in second dataset 824 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in second dataset 824 may be captured at different time points periodically, intermittently, when an event occurs, etc. One or more columns may include a time value. Similar to input dataset 124, data stored in second dataset 824 may be generated as part of the IoT, and some or all data may be pre- or post-processed by an ESPE.

Similar to input dataset 124, second dataset 824 may be stored in various compressed formats such as a coordinate format, a compressed sparse column format, a compressed sparse row format, etc. Second dataset 824 further may be stored using various structures as known to those skilled in the art including a file system, a relational database, a system of tables, a structured query language database, etc. on prediction device 800 and/or on distributed computing system 828. Prediction device 800 may coordinate access to second dataset 824 that is distributed across a plurality of computing devices that make up distributed computing system 828. For example, second dataset 824 may be stored in a cube distributed across a grid of computers as understood by a person of skill in the art. As another example, second dataset 824 may be stored in a multi-node Hadoop® cluster. As another example, second dataset 824 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in second dataset 824.

Figure 9:
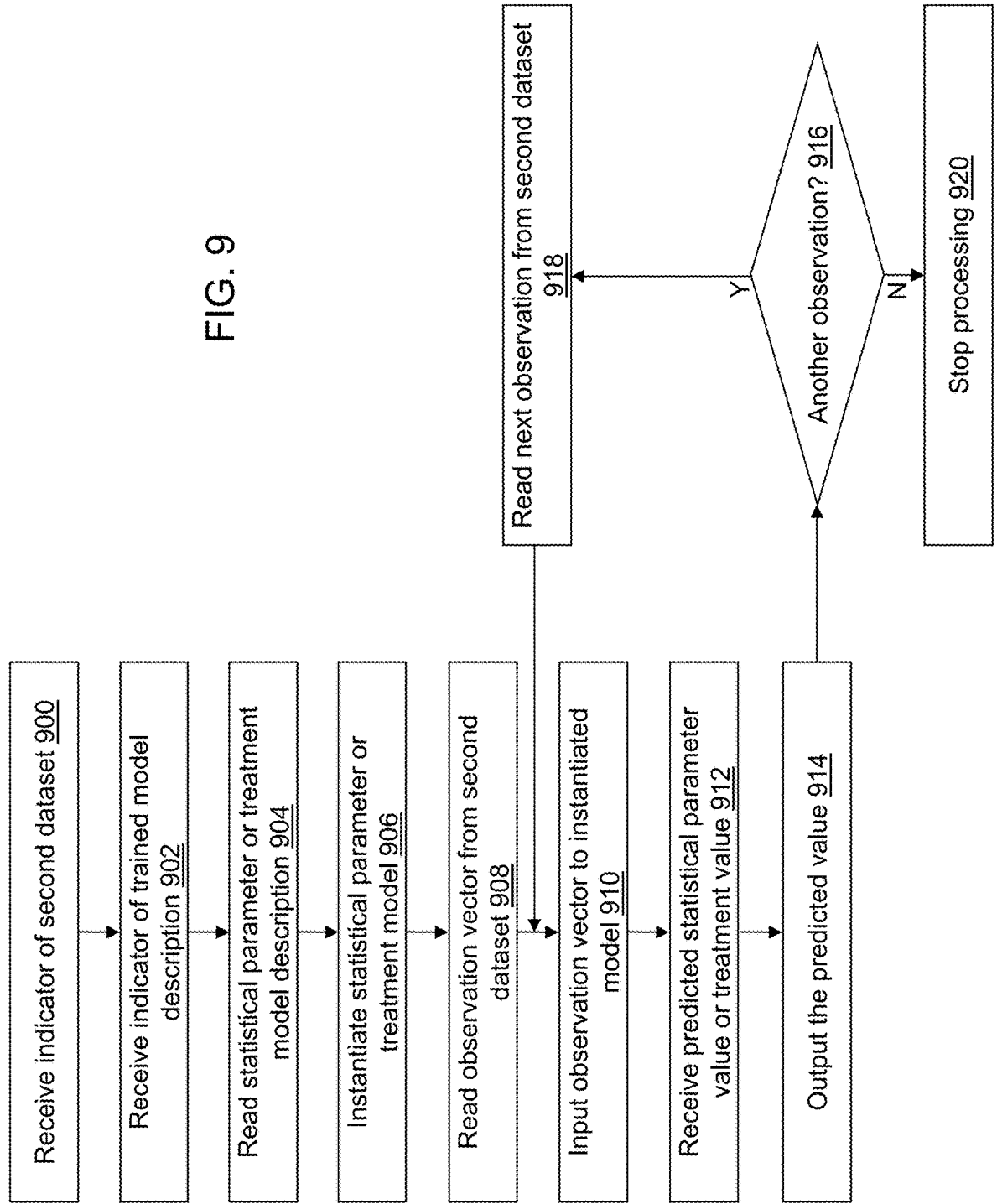
FIG. 9 depicts a flow diagram illustrating examples of operations performed by a prediction application of the prediction device of FIG. 8 in accordance with an illustrative embodiment.

Referring to FIG. 9, example operations of prediction application 822 are described. Additional, fewer, or different operations may be performed depending on the embodiment of prediction application 822. The order of presentation of the operations of FIG. 9 is not intended to be limiting. Although some of the operational flows are presented in sequence, the various operations may be performed in various repetitions, concurrently (in parallel, for example, using threads and/or distributed computing system 828), and/or in other orders than those that are illustrated.

In an operation 900, an eighth indicator may be received that indicates second dataset 824. For example, the eighth indicator indicates a location and a name of second dataset 824. As an example, the eighth indicator may be received by prediction application 822 after selection from a user interface window or after entry by a user into a user interface window. In an alternative embodiment, second dataset 824 may not be selectable. For example, a most recently created dataset may be used automatically.

In an operation 902, a ninth indicator may be received that indicates trained model description 126. For example, the ninth indicator indicates a location and a name of trained model description 126. As an example, the ninth indicator may be received by prediction application 822 after selection from a user interface window or after entry by a user into a user interface window. In an alternative embodiment, trained model description 126 may not be selectable. For example, most recently created model configuration data may be used automatically. As another example, trained model description 126 may be provided automatically as part of integration with training application 122. In an alternative embodiment, the treatment and outcome models may be stored in different files, tables, etc.

In an operation 904, one or both of the trained treatment model or the trained outcome model description is read from trained model description 126. In an illustrative embodiment, a single outcome model trained in operation 212 or operation 508 may have been stored in trained model description 126. For example, the trained model with the highest accuracy or lowest error may be identified and stored in trained model description 126.

In an operation 906, one or both of the trained treatment model or the trained outcome model is instantiated with the model description. For the outcome model, the weight $W_j$ and bias $b_j$ values for each respective neuron are selected randomly from a Gaussian distribution given $W_{j,k}=\mu_{W,j,k}+\sigma_{W,j,k}\epsilon_{W,j,k}$ and $b_{j,k}=\mu_{b,j,k}+\sigma_{b,j,k}\epsilon_{b,j,k}$, where j indicates a specific neuron, and k represents the trained BNN stored in trained model description 126.

In an operation 908, an observation vector is read from second dataset 824.

In an operation 910, the observation vector is input to the instantiated model, which is either or both of the treatment model or the outcome model.

In an operation 912, a predicted treatment or outcome value for the read observation vector is received as an output of the instantiated model.

In an operation 914, the predicted treatment value may be output, for example, by storing the predicted treatment value and/or the predicted outcome value with the observation vector to predicted dataset 826. In addition, or in the alternative, the predicted treatment value and/or the predicted outcome value may be presented on second display 816, printed on second printer 820, sent to another computing device using second communication interface 806, an alarm or other alert signal may be sounded through second speaker 818, etc.

In an operation 916, a determination is made concerning whether or not second dataset 824 includes another observation vector. When second dataset 824 includes another observation vector, processing continues in an operation 918. When second dataset 824 does not include another observation vector, processing continues in an operation 920.

In operation 918, a next observation vector is read from second dataset 824, and processing continues in operation 910.

In operation 920, processing stops and cleanup is performed as needed.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:

(A) train a first number of Bayesian neural network (BNN) models that each includes a plurality of connected neural network layers using a plurality of observation vectors and a first random seed value, wherein each layer of the plurality of connected neural network layers includes a plurality of neurons, wherein each observation vector includes covariate variable values for a plurality of covariate variables, wherein each of the trained first number of the BNN models computes a weight mean value, a weight standard deviation value, a bias mean value, and a bias standard deviation value for each neuron of the plurality of neurons;

(BA) for the plurality of neurons of each of the first number of the BNN models, compute a second number of weight values using the weight mean value, the weight standard deviation value, and a second number of weight random draws from a predefined weight error parameter distribution function of a respective neuron;

(BB) for the plurality of neurons of each of the first number of the BNN models, compute a second number of bias values using the bias mean value, the bias standard deviation value, and a second number of bias random draws from a predefined bias error parameter distribution function of the respective neuron;

(BC) instantiate a second number of neural network (NN) models based on outputs of the first number of BNN models with the computed second number of the weight values and the computed second number of the bias values for the plurality of neurons of each of the trained first number of the BNN models;

(C) execute each of the second number of the NN models instantiated in (BC) with the plurality of observation vectors to compute a first plurality of estimated statistical parameter values for each observation vector of the plurality of observation vectors;

(D) combine the first plurality of the estimated statistical parameter values from each of the second number of the NN models to generate a second plurality of the estimated statistical parameter values;

(E) compute a plurality of point estimate values for each observation vector of the plurality of observation vectors from the second plurality of the estimated statistical parameter values and for each observation vector of the plurality of observation vectors in (C); and (F) output the computed plurality of point estimate values for each observation vector of the plurality of observation vectors.

2. The non-transitory computer-readable medium of claim 1, wherein each of the plurality of point estimate values is computed using $$\hat{y}(x_i) = \frac{1}{N_s}\sum_{j=1}^{N_s} y_j(x_i),$$

where $\hat{y}(x_i)$ indicates a point estimate value computed for an $i^{th}$ observation vector of the plurality of observation vectors, $x_i$ indicates the covariate variable values for the $i^{th}$ observation vector, $N_s$ indicates a number of samples of the plurality of NN models, and $y_j(x_i)$ indicates an estimated statistical parameter value for a $j^{th}$ NN model of the plurality of NN models, wherein $y_j(x_i)$ is computed in an output layer of the plurality of connected neural network layers.

3. The non-transitory computer-readable medium of claim 1, wherein each of the plurality of point estimate values is computed using $$\hat{\alpha}(x_i) = \frac{1}{N_s}\sum_{j=1}^{N_s} \alpha_j(x_i),$$

where $\hat{\alpha}(x_i)$ indicates a point estimate value for an $i^{th}$ observation vector of the plurality of observation vectors, $x_i$ indicates the covariate variable values for the $i^{th}$ observation vector, $N_s$ indicates a number of samples of the plurality of NN models, and $\alpha_j(x_i)$ indicates an estimated statistical parameter value for a $j^{th}$ NN model of the plurality of NN models, wherein $\alpha_j(x_i)$ is computed in a parameter layer of the plurality of connected neural network layers, wherein the parameter layer precedes an output layer of the plurality of connected neural network layers.

4. The non-transitory computer-readable medium of claim 3, wherein, after (E), the computer-readable instructions further cause the computing device to compute a credible interval for each of the plurality of observation vectors for a range of values of the point estimate value as the interval (c,d) where c and d are, respectively, the CI/2 and 1−CI/2 percentiles of the $N_s$ sample values of $\alpha_j(x_i)$, where CI indicates the credible interval.

5. The non-transitory computer-readable medium of claim 3, wherein, before (F), the computer-readable instructions further cause the computing device to:

compute a second point estimate value for each observation vector of the plurality of observation vectors from a second estimated statistical parameter value computed for each of the plurality of NN models instantiated in (BC) and for each observation vector of the plurality of observation vectors in (C), wherein the computed second point estimate value is further output for each observation vector of the plurality of observation vectors in (F).

6. The non-transitory computer-readable medium of claim 5, wherein the second point estimate value is computed using $$\hat{\beta}(x_i) = \frac{1}{N_s}\sum_{j=1}^{N_s} \beta_j(x_i),$$

where $\hat{\beta}(x_i)$ indicates the second point estimate value computed for the $i^{th}$ observation vector of the plurality of observation vectors, and $\beta_j(x_i)$ indicates the second estimated statistical parameter value for a $j^{th}$ NN model of the plurality of NN models, wherein $\beta_j(x_i)$ is computed in the parameter layer.

7. The non-transitory computer-readable medium of claim 6, wherein, after (E), the computer-readable instructions further cause the computing device to compute a second credible interval for each of the plurality of observation vectors for a second range of values of the second point estimate value as the interval (e,f) where e and f are, respectively, the $CI_2/2$ and $1-CI_2/2$ percentiles of the $N_s$ sample values of $\beta_j(x_i)$, where $CI_2$ indicates the second credible interval.

8. The non-transitory computer-readable medium of claim 6, wherein a third point estimate value is computed as a nonlinear combination of the point estimate value and the second point estimate value.

9. The non-transitory computer-readable medium of claim 1, wherein, before (F), the computer-readable instructions further cause the computing device to:

(FA) train a second BNN model that includes the plurality of connected neural network layers identical to each of the first number of BNN models using the plurality of observation vectors and a second random seed value that is distinct from the first random seed value, wherein the trained second BNN model computes a second weight mean value, a second weight standard deviation value, a second bias mean value, and a second bias standard deviation value for each neuron of the plurality of neurons;

(GA) compute a third weight value for each neuron using the second weight mean value, the second weight standard deviation value, and a second weight random draw from the predefined weight error parameter distribution function of the respective neuron;

(GB) compute a third bias value for each neuron using the second bias mean value, the second bias standard deviation value, and a second bias random draw from the predefined bias error parameter distribution function of the respective neuron;

(GC) instantiate a third neural network (NN) model with the computed third weight value and the computed third bias value for each neuron of the trained second BNN model;

(GD) repeat (GA) to (GC) for each of a fourth plurality of NN models; and (H) execute each third NN model instantiated in (GC) with the plurality of observation vectors to compute the first plurality of estimated statistical parameter values for each observation vector of the plurality of observation vectors;

wherein in (E), computing the plurality of point estimate values for each observation vector of the plurality of observation vectors further includes the first plurality of estimated statistical parameter values computed for each third NN model instantiated in (GC) and for each observation vector of the plurality of observation vectors in (H).

10. The non-transitory computer-readable medium of claim 9, wherein each of the plurality of point estimate values is computed using $$\hat{y}(x_i) = \frac{1}{2*N_s} \sum_{k=1}^{2} \sum_{j=1}^{N_s} y_{j,k}(x_i),$$

where $\hat{y}(x_i)$ indicates a point estimate value computed for an $i^{th}$ observation vector of the plurality of observation vectors, $x_i$ indicates the covariate variable values for the $i^{th}$ observation vector, $N_s$ indicates a number of samples of the plurality of NN models, $y_{j,1}(x_i)$ indicates the estimated statistical parameter value for a $j^{th}$ NN model of the plurality of NN models instantiated from the trained first number of BNN models, $y_{j,2}(x_i)$ indicates the estimated statistical parameter value for the $j^{th}$ NN model of the fourth plurality of NN models instantiated from the trained second BNN model, wherein $y_{j,1}(x_i)$ and $y_{j,2}(x_i)$ are computed in an output layer of the plurality of connected neural network layers.

11. The non-transitory computer-readable medium of claim 9, wherein the each of the plurality of point estimate values is computed using $$\hat{\alpha}(x_i) = \frac{1}{2*N_s} \sum_{k=1}^{2} \sum_{j=1}^{N_s} \alpha_{j,k}(x_i),$$

where $\hat{\alpha}(x_i)$ indicates a point estimate value computed for an $i^{th}$ observation vector of the plurality of observation vectors, $x_i$ indicates the covariate variable values for the $i^{th}$ observation vector, $N_s$ indicates a number of samples of the plurality of NN models, $\alpha_{j,1}(x_i)$ indicates the estimated statistical parameter value for a $j^{th}$ NN model of the plurality of NN models instantiated from the trained first number of BNN models, and $\alpha_{j,2}(x_i)$ indicates an estimated statistical parameter value for the $j^{th}$ NN model of the fourth plurality of NN models instantiated from the trained second BNN model, wherein $\alpha_{j,1}(x_i)$ and $\alpha_{j,2}(x_i)$ are computed in a parameter layer of the plurality of connected neural network layers, wherein the parameter layer precedes an output layer of the plurality of connected neural network layers.

12. The non-transitory computer-readable medium of claim 11, wherein, after (E), the computer-readable instructions further cause the computing device to compute a credible interval for each of the plurality of observation vectors for a range of values of the point estimate value as the interval (c,d) where c and d are, respectively, the CI/2 and 1−CI/2 percentiles of the $2*N_s$ sample values of $\alpha_{j,k}(x_i)$, where CI indicates the credible interval.

13. The non-transitory computer-readable medium of claim 11, wherein, before (F) and after (H), the computer-readable instructions further cause the computing device to:

(I) compute a second point estimate value for each observation vector of the plurality of observation vectors from a second estimated statistical parameter value computed for each of the second number of NN models instantiated in (BC) and for each observation vector of the plurality of observation vectors in (C) and for each NN model instantiated in (GC) and for each observation vector of the plurality of observation vectors in (H), wherein the computed second point estimate value is further output for each observation vector of the plurality of observation vectors in (E).

14. The non-transitory computer-readable medium of claim 13, wherein the second point estimate value is computed using $$\hat{\beta}(x_i) = \frac{1}{2*N_s} \sum_{k=1}^{2} \sum_{j=1}^{N_s} \beta_{j,k}(x_i),$$

where $\hat{\beta}(x_i)$ indicates the second point estimate value computed for the $i^{th}$ observation vector of the plurality of observation vectors, $\beta_{j,1}(x_i)$ indicates the second estimated statistical parameter value for the $j^{th}$ BNN model of the plurality of NN models instantiated from the trained first number of BNN models, and $\beta_{j,2}(x_i)$ indicates the second estimated statistical parameter value for the $j^{th}$ NN model of the fourth plurality of NN models instantiated in (GC) from the trained second BNN model, wherein $\beta_{j,1}(x_i)$ and $\beta_{j,2}(x_i)$ are computed in the parameter layer.

15. The non-transitory computer-readable medium of claim 14, wherein, after (I), the computer-readable instructions further cause the computing device to compute a second credible interval for each of the plurality of observation vectors for a second range of values of the second point estimate value as the interval (e,f) where e and f are, respectively, the $CI_2/2$ and $1−CI_2/2$ percentiles of the $2*N_s$ sample values of $\beta_{j,k}(x_i)$, where $CI_2$ indicates the second credible interval.

16. The non-transitory computer-readable medium of claim 1, wherein each observation vector further includes a treatment variable value for a treatment variable, and wherein, before (A), the computer-readable instructions further cause the computing device to:

train a treatment model to optimize a treatment loss function using the covariate variable values for the plurality of covariate variables and the treatment variable value of the treatment variable of each observation vector of the plurality of observation vectors;

execute the trained treatment model to compute an estimated treatment variable value for each observation vector of the plurality of observation vectors; and compute an observation weight value for each observation vector of the plurality of observation vectors using the estimated treatment variable value and the treatment variable value for a respective observation vector of the plurality of observation vectors,
wherein the computed observation weight is included in a loss function when training the first BNN model in (A).

17. The non-transitory computer-readable medium of claim 16, wherein the observation weight value is computed using $$s_i = \exp\left(\frac{(t_i - \hat{t}_i)^2}{v}\right),$$

i=1, ..., n, where $s_i$ indicates the observation weight value for an $i^{th}$ observation vector of the plurality of observation vectors, $t_i$ indicates the treatment variable value for the $i^{th}$ observation vector of the plurality of observation vectors, $\hat{t}_i$ indicates the estimated treatment variable value for the $i^{th}$ observation vector of the plurality of observation vectors, n indicates a number of the plurality of observation vectors, and $$v = \frac{1}{n}\sum_{i=1}^{n}(\hat{t}_i - t_i)^2.$$

18. The non-transitory computer-readable medium of claim 16, wherein the loss function includes the observation weight value using $\log(\Pi_{i=1}^{n} p(y_i|x_i, t_i, W, b)^{s_i})$ where $s_i$ indicates the observation weight value for an $i^{th}$ observation vector of the plurality of observation vectors, $y_i$ indicates the estimated statistical parameter value for the $i^{th}$ observation vector, $x_i$ indicates the covariate variable values for the $i^{th}$ observation vector, $t_i$ indicates the treatment variable value for the $i^{th}$ observation vector, n indicates a number of the plurality of observation vectors, W indicates a weight matrix that includes a current weight value for each neuron, b indicates a weight matrix that includes a current bias value for each neuron, and $p(y_i|x_i, t_i, W, b)$ indicates a likelihood of $y_i$ given $x_i$, $t_i$, W, b.

19. The non-transitory computer-readable medium of claim 16, wherein the computer-readable instructions further cause the computing device to:
read an observation vector from a dataset;
execute the trained treatment model with the read observation vector to predict a treatment value for the read observation vector; and
output the predicted treatment value for the read observation vector.

20. The non-transitory computer-readable medium of claim 16, wherein each of the plurality of point estimate values is computed using $$\hat{y}(x_i, t_i) = \frac{1}{N_s}\sum_{j=1}^{N_s} y_j(x_i, t_i),$$

where $\hat{y}(x_i, t_i)$ indicates a point estimate value computed for an $i^{th}$ observation vector of the plurality of observation vectors, $x_i$ indicates the covariate variable values for the $i^{th}$ observation vector, $t_1$ indicates the treatment variable value for the $i^{th}$ observation vector, $N_s$ indicates a number of samples of the plurality of NN models, and $y_j(x_i,t_i)$ indicates an estimated statistical parameter value for a $j^{th}$ NN model of the plurality of NN models, wherein $y_j(x_i,t_i)$ is computed in an output layer of the plurality of connected neural network layers.

21. The non-transitory computer-readable medium of claim 16, wherein the each of the plurality of point estimate values is computed using $$\hat{\alpha}(x_i) = \frac{1}{N_s}\sum_{j=1}^{N_s}\alpha_j(x_i),$$

where $\hat{\alpha}(x_i)$ indicates the point estimate value computed for an $i^{th}$ observation vector of the plurality of observation vectors, $x_i$ indicates the covariate variable values for the $i^{th}$ observation vector, $N_s$ indicates a number of samples of the plurality of NN models, and $\alpha_j(x_i)$ indicates the estimated statistical parameter value for a $j^{th}$ NN model of the plurality of NN models, wherein $\alpha_j(x_i)$ is computed in a parameter layer of the plurality of connected neural network layers, wherein the parameter layer precedes an output layer of the plurality of connected neural network layers.

22. The non-transitory computer-readable medium of claim 21, wherein, before (E), the computer-readable instructions further cause the computing device to:
compute a second point estimate value for each observation vector of the plurality of observation vectors from a second estimated statistical parameter value computed for each of the second number of the NN models instantiated in (BC) and for each observation vector of the plurality of observation vectors in (C),
wherein the computed second point estimate value is further output for each observation vector of the plurality of observation vectors in (E).

23. The non-transitory computer-readable medium of claim 22, wherein the second point estimate value is computed using $$\hat{\beta}(x_i) = \frac{1}{N_s}\sum_{j=1}^{N_s}\beta_j(x_i),$$

where $\hat{\beta}(x_i)$ indicates the second point estimate value computed for the $i^{th}$ observation vector of the plurality of observation vectors, and $\beta_j(x_i)$ indicates the second estimated statistical parameter value for a $j^{th}$ NN model of the plurality of NN models, wherein $\beta_j(x_i)$ is computed in the parameter layer.

24. The non-transitory computer-readable medium of claim 16, wherein, before (E), the computer-readable instructions further cause the computing device to:
(FA) train a second BNN model that includes the plurality of connected neural network layers identical to each of the first number of BNN models using the plurality of observation vectors and a second random seed value that is distinct from the first random seed value, wherein the trained second BNN model computes a second weight mean value, a second weight standard deviation value, a second bias mean value, and a second bias standard deviation value for each neuron of the plurality of neurons;
(GA) compute a third weight value for each neuron using the second weight mean value, the second weight standard deviation value, and a second weight random draw from the predefined weight error parameter distribution function of the respective neuron;

(GB) compute a third bias value for each neuron using the second bias mean value, the second bias standard deviation value, and a second bias random draw from the predefined bias error parameter distribution function of the respective neuron;

(GC) instantiate a third neural network (NN) model with the computed third weight value and the computed third bias value for each neuron of the trained second BNN model;

(GD) repeat (GA) to (GC) for each of a fourth plurality of NN models; and (H) execute each third NN model instantiated in (GC) with the plurality of observation vectors to compute the estimated statistical parameter value for each observation vector of the plurality of observation vectors;

wherein in (D), computing the point estimate value for each observation vector of the plurality of observation vectors further includes the estimated statistical parameter value computed for each second NN model instantiated in (GC) and for each observation vector of the plurality of observation vectors in (H).

25. The non-transitory computer-readable medium of claim 24, wherein each of the plurality of point estimate is computed using $$\hat{y}(x_i, t_i) = \frac{1}{2*N_s} \sum_{k=1}^{2} \sum_{j=1}^{N_s} y_{j,k}(x_i, t_i),$$

$\hat{y}(x_i, t_i)$ indicates a point estimate value computed for an $i^{th}$ observation vector of the plurality of observation vectors, $x_i$ indicates the covariate variable values for the $i^{th}$ observation vector, $t_i$ indicates the treatment variable value for the $i^{th}$ observation vector, $N_s$ indicates a number of samples of the plurality of NN models, $y_{j,1}(x_i, t_i)$ indicates the estimated statistical parameter value for a $j^{th}$ NN model of the plurality of NN models instantiated from the trained first BNN model, $y_{j,2}(x_i, t_i)$ indicates an estimated statistical parameter value for the $j^{th}$ NN model of the plurality of NN models instantiated from the trained second BNN model, wherein $y_{j,1}(x_i, t_i)$ and $y_{j,2}(x_i, t_i)$ are computed in an output layer of the plurality of connected neural network layers.

26. The non-transitory computer-readable medium of claim 24, wherein each of the plurality of point estimate is computed using $$\hat{\alpha}(x_i) = \frac{1}{2*N_s} \sum_{k=1}^{2} \sum_{j=1}^{N_s} \alpha_{j,k}(x_i),$$

where $\hat{\alpha}(x_i)$ indicates a point estimate value computed for an $i^{th}$ observation vector of the plurality of observation vectors, $x_i$ indicates the covariate variable values for the $i^{th}$ observation vector, $N_s$ indicates a number of samples of the plurality of NN models, $\alpha_{j,1}(x_i)$ indicates the estimated statistical parameter value for a $j^{th}$ NN model of the plurality of NN models instantiated from the trained first BNN model, and $\alpha_{j,2}(x_i)$ indicates an estimated statistical parameter value for the $j^{th}$ NN model of the plurality of NN models instantiated from the trained second BNN model, wherein $\alpha_{j,1}(x_i)$ and $\alpha_{j,2}(x_i)$ are computed in a parameter layer of the plurality of connected neural network layers, wherein the parameter layer precedes an output layer of the plurality of connected neural network layers.

27. The non-transitory computer-readable medium of claim 26, wherein, before (F) and after (H), the computer-readable instructions further cause the computing device to:

(I) compute a second point estimate value for each observation vector of the plurality of observation vectors from a second estimated statistical parameter value computed for each of the second number of NN models instantiated in (BC) and for each observation vector of the plurality of observation vectors in (C) and for each third NN model instantiated in (GC) and for each observation vector of the plurality of observation vectors in (H), wherein the computed second point estimate value is further output for each observation vector of the plurality of observation vectors in (E).

28. The non-transitory computer-readable medium of claim 27, wherein the second point estimate value is computed using $$\hat{\beta}(x_i) = \frac{1}{2*N_s} \sum_{k=1}^{2} \sum_{j=1}^{N_s} \beta_{j,k}(x_i),$$

where $\hat{\beta}(x_i)$ indicates the second point estimate value computed for the $i^{th}$ observation vector of the plurality of observation vectors, $\beta_{j,1}(x_i)$ indicates the second estimated statistical parameter value for the $j^{th}$ NN model of the plurality of NN models instantiated from the trained first BNN model, and $\beta_{j,2}(x_i)$ indicates the second estimated statistical parameter value for the $j^{th}$ NN model of the plurality of NN models instantiated from the trained second BNN model, wherein $\beta_{j,1}(x_i)$ and $\beta_{j,2}(x_i)$ are computed in the parameter layer.

29. A computing device comprising:
a processor; and
a computer-readable medium operably coupled to the processor, the computer-readable medium having computer-readable instructions stored thereon that, when executed by the processor, cause the computing device to (A) train a first number of Bayesian neural network (BNN) models that each includes a plurality of connected neural network layers using a plurality of observation vectors and a first random seed value, wherein each layer of the plurality of connected neural network layers includes a plurality of neurons, wherein each observation vector includes covariate variable values for a plurality of covariate variables, wherein each of the trained first number of the BNN models computes a weight mean value, a weight standard deviation value, a bias mean value, and a bias standard deviation value for each neuron of the plurality of neurons;

(BA) for the plurality of neurons of each of the first number of the BNN models, compute a second number of weight values using the weight mean value, the weight standard deviation value, and a second number of weight random draws from a predefined weight error parameter distribution function of a respective neuron;

(BB) for the plurality of neurons of each of the first number of the BNN models, compute a second number of bias values using the bias mean value, the bias standard deviation value, and a second number of bias random draws from a predefined bias error parameter distribution function of the respective neuron;

(BC) instantiate a second number of neural network (NN) models based on outputs of the first number of BNN models with the computed second number of the weight values and the computed second number of the bias values for the plurality of neurons of each of the trained first number of the BNN models;

(C) execute each of the second number of the neural network models instantiated in (BC) with the plurality of observation vectors to compute a first plurality of estimated statistical parameter values for each observation vector of the plurality of observation vectors;

(D) combine the first plurality of the estimated statistical parameter values from each of the second number of the neural network models to generate a second plurality of the estimated statistical parameter values;

(E) compute a plurality of point estimate values for each observation vector of the plurality of observation vectors from the second plurality of the estimated statistical parameter values and for each observation vector of the plurality of observation vectors in (C); and (F) output the computed plurality of point estimate values for each observation vector of the plurality of observation vectors.

30. A method of computing a point estimate value for an individual using a Bayesian neural network model, the method comprising:

(A) training, by a computing device, a first number of Bayesian neural network (BNN) models that each includes a plurality of connected neural network layers using a plurality of observation vectors and a first random seed value, wherein each layer of the plurality of connected neural network layers includes a plurality of neurons, wherein each observation vector includes covariate variable values for a plurality of covariate variables, wherein each of the trained first number of the BNN models computes a weight mean value, a weight standard deviation value, a bias mean value, and a bias standard deviation value for each neuron of the plurality of neurons;

(BA) for the plurality of neurons of each of the first number of the BNN models, computing, by the computing device, a second number of weight values using the weight mean value, the weight standard deviation value, and a second number of weight random draws from a predefined weight error parameter distribution function of a respective neuron;

(BB) for the plurality of neurons of each of the first number of the BNN models, computing, by the computing device, a second number of bias values using the bias mean value, the bias standard deviation value, and a second number of bias random draws from a predefined bias error parameter distribution function of the respective neuron;

(BC) instantiating, by the computing device, a second number of neural network (NN) models based on outputs of the first number of BNN models with the computed second number of the weight values and the computed second number of the bias values for each of the plurality of neurons of each of the trained first number of the BNN models;

(C) executing, by the computing device, each of the second number of the neural network models instantiated in (BC) with the plurality of observation vectors to compute a first plurality of estimated statistical parameter values for each observation vector of the plurality of observation vectors;

(D) combining, by the computing device, the first plurality of the estimated statistical parameter values from each of the second number of the neural network models to generate a second plurality of the estimated statistical parameter values;

(E) computing, by the computing device, a plurality of point estimate values for each observation vector of the plurality of observation vectors from the second plurality of the estimated statistical parameter values and for each observation vector of the plurality of observation vectors in (C); and (F) outputting, by the computing device, the computed plurality of point estimate values for each observation vector of the plurality of observation vectors.

* * * * *

UNITED STATES PATENT AND TRADEMARK OFFICE
CERTIFICATE OF CORRECTION

Page 1 of 1

PATENT NO. : 12,210,954 B2
APPLICATION NO. : 18/530798
DATED : January 28, 2025
INVENTOR(S) : Sylvie Tchumtchoua Kabisa et al.

It is certified that error appears in the above-identified patent and that said Letters Patent is hereby corrected as shown below:

In the Claims

Claim 18, Column 29, Line 32:
Delete the phrase "$\log(\prod_{i=1}^{n} p(y_i|x_i, t_i, W, b)^{s_i})$," and replace with --$\log(\prod_{i=1}^{n} p(y_i|x_i, t_i, W, b)^{s_i})$;--.

Claim 25, Column 31, Line 32:
Delete the phrase "$\hat{y}(x_i, t_i)$" and replace with --where $\hat{y}(x_i, t_i)$--.

Signed and Sealed this
Third Day of June, 2025

Coke Morgan Stewart
*Acting Director of the United States Patent and Trademark Office*